(12) United States Patent
Hill

(10) Patent No.: US 11,067,374 B2
(45) Date of Patent: Jul. 20, 2021

(54) REMOTELY CONTROLLABLE AERONAUTICAL ORDNANCE LOITERING

(71) Applicant: Overwatch Defense, LLC, Davenport, FL (US)

(72) Inventor: Jeffrey Hill, Davenport, FL (US)

(73) Assignee: Overwerx Ltd., Wolverhampton (GB)

( * ) Notice: Subject to any disclaimer, the term of this patent is extended or adjusted under 35 U.S.C. 154(b) by 0 days.

(21) Appl. No.: 16/153,696

(22) Filed: Oct. 5, 2018

(65) Prior Publication Data

US 2019/0107374 A1 Apr. 11, 2019

Related U.S. Application Data

(60) Provisional application No. 62/568,518, filed on Oct. 5, 2017, provisional application No. 62/726,976, filed on Sep. 4, 2018.

(51) Int. Cl.
*F42B 15/01* (2006.01)
*G05D 1/00* (2006.01)
(Continued)

(52) U.S. Cl.
CPC .............. *F42B 15/01* (2013.01); *F42B 10/38* (2013.01); *F42B 12/02* (2013.01); *F42B 15/10* (2013.01);
(Continued)

(58) Field of Classification Search
CPC .......... F42B 15/01; F42B 15/10; F42B 12/02; F42B 10/38; F42B 12/20; F42B 10/14;
(Continued)

(56) References Cited

U.S. PATENT DOCUMENTS

| 5,657,947 A | * | 8/1997 | Mayersak | ............... G01S 19/18 244/3.19 |
| 2005/0051667 A1 | * | 3/2005 | Ariton | ............... G08B 13/19621 244/17.11 |

(Continued)

OTHER PUBLICATIONS

International Search Report dated Aug. 16, 2019, including Written Opinion of the ISA, Application No. PCT/US2018/054767 filed Oct. 8, 2018, "Remotely Controllable Aeronautical Ordnance Loitering" Written Opinion completed Jul. 26, 2019 and dated Aug. 16, 2019. 10 pages.

*Primary Examiner* — Jonathan M Dager
*Assistant Examiner* — Jean W Charleston
(74) *Attorney, Agent, or Firm* — Accel IP Law, PLLC; Ferdinand M. Romano

(57) ABSTRACT

An ordnance for air-borne delivery to a target under remotely controlled in-flight navigation. In one embodiment, self-powered aerial ordnance includes upper and lower cases. A plurality of co-axial, deployable blades is powered by a motor positioned in the upper case. When deployed, the blades are rotatable about the upper case to impart thrust and bring the vehicle to a first altitude above a target position. An explosive material and a camera are positioned in a lower case which is attached to the upper case. The camera generates a view along the ground plane and above the target when the ordinance is in flight. When the vehicle is deployed it is remotely controllable to deliver the vehicle to the target to detonate the explosive at the target. The ordnance may drop directly on a target as a bomb does.

19 Claims, 22 Drawing Sheets

(51) Int. Cl.
  *F42B 10/38*  (2006.01)
  *G06K 9/00*  (2006.01)
  *F42C 13/04*  (2006.01)
  *F42B 12/02*  (2006.01)
  *F42B 15/10*  (2006.01)
  *H04N 7/18*  (2006.01)
  *F42C 1/00*  (2006.01)

(52) U.S. Cl.
  CPC .............. *F42C 1/00* (2013.01); *F42C 13/047* (2013.01); *G05D 1/0022* (2013.01); *G05D 1/0038* (2013.01); *G06K 9/0063* (2013.01); *H04N 7/185* (2013.01)

(58) Field of Classification Search
  CPC .......... F42B 10/62; F42B 15/08; F42B 25/00; F42B 12/50; F42B 12/46; F42B 12/365; F42B 12/42; F42C 1/00; F42C 13/047; F42C 13/04; H04N 7/185; G06K 9/0063; G05D 1/0038; G05D 1/0022; G05D 1/12
  USPC ............................................................ 701/2
  See application file for complete search history.

(56) References Cited

U.S. PATENT DOCUMENTS

| | | | |
|---|---|---|---|
| 2007/0284474 A1* | 12/2007 | Olson | H04W 4/40 244/10 |
| 2010/0012774 A1* | 1/2010 | Fanucci | F42B 12/365 244/49 |
| 2010/0140415 A1* | 6/2010 | Goossen | B64C 39/024 244/23 A |
| 2012/0211589 A1 | 8/2012 | Uzman | |
| 2012/0247714 A1* | 10/2012 | Morris | B60H 1/00064 165/42 |
| 2015/0247714 A1* | 9/2015 | Teetzel | G05D 1/107 244/3.11 |
| 2016/0025457 A1 | 1/2016 | Miralles | |
| 2016/0167778 A1* | 6/2016 | Meringer | B64C 27/006 244/17.23 |
| 2017/0059692 A1* | 3/2017 | Laufer | F41G 7/2253 |
| 2018/0118334 A1 | 5/2018 | Stamps et al. | |
| 2018/0209764 A1* | 7/2018 | Ginsberg | G01S 7/4815 |

* cited by examiner

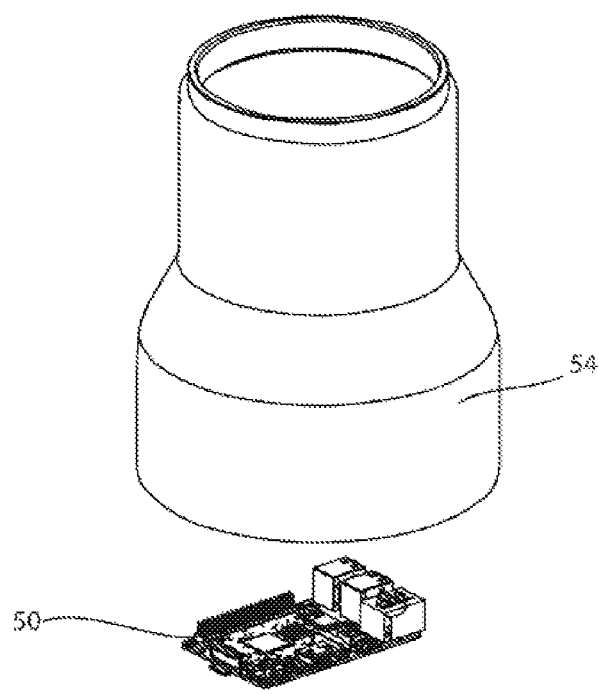
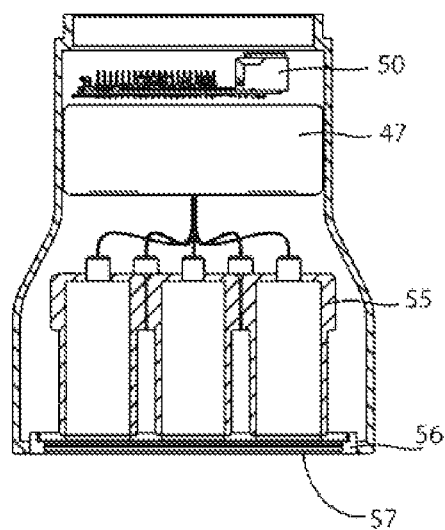
Fig. 17
Fig. 16

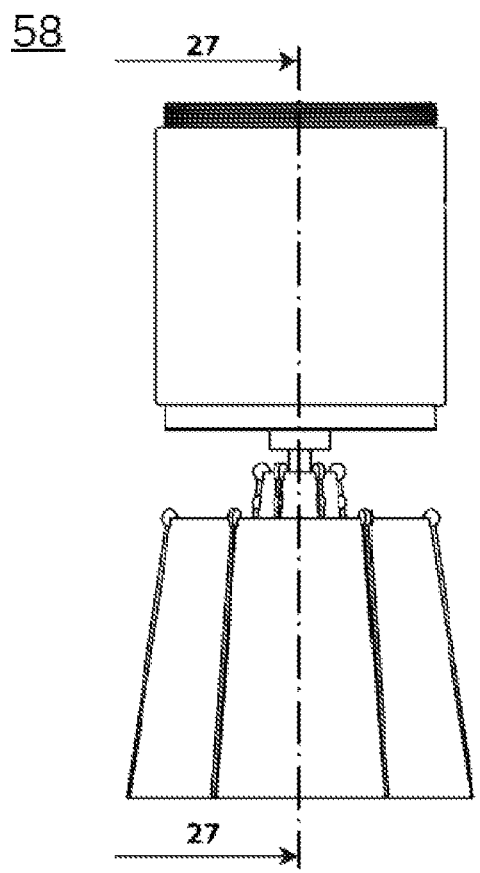
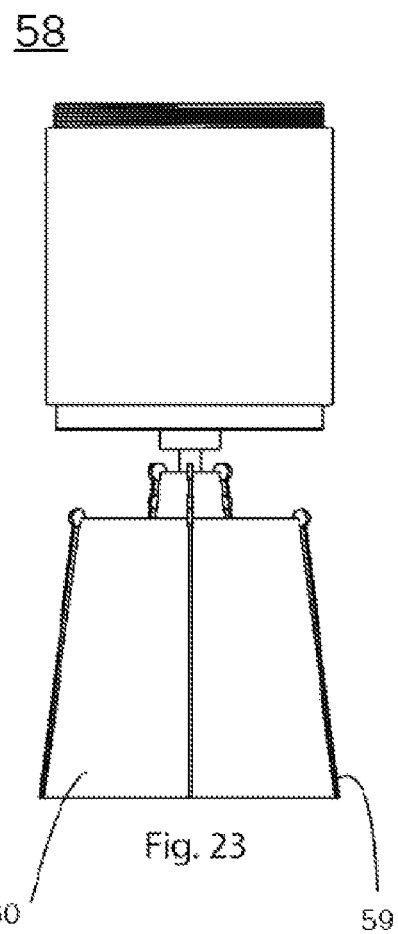
Fig. 22　　　　　Fig. 23
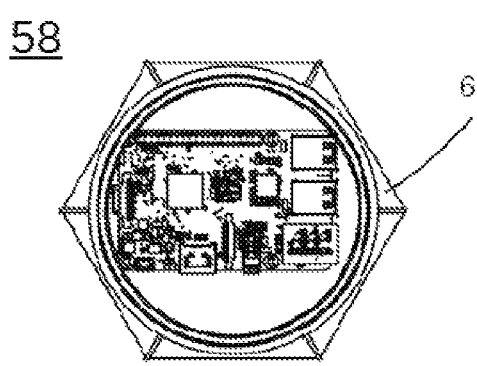
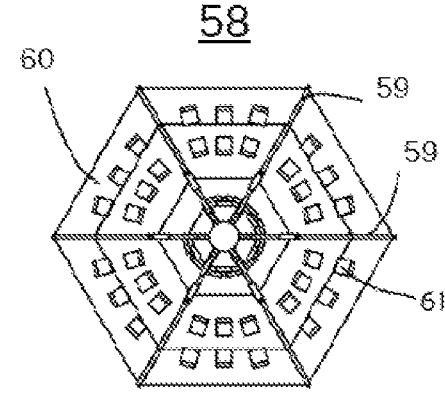
Fig. 24　　　　　Fig. 25

53

REMOTELY CONTROLLABLE AERONAUTICAL ORDNANCE LOITERING

PRIORITY AND RELATED APPLICATIONS

This application claims priority to U.S. Provisional Patent Application Ser. No. 62/568,518, "Remotely Controllable Aeronautical Ordnance", filed 5 Oct. 2017 and claims priority to U.S. Provisional Patent Application Ser. No. 62/726,976, 6Remotely Controllable Aeronautical Ordnance Loitering", filed 4 Sep. 2018, and for which the disclosure of each is now incorporated herein by reference. This application is related to U.S. Pat. No. 10,093,417, filed 10 Nov. 2015, NUnmanned Flying Device", which is incorporated herein by reference.

FIELD OF THE INVENTION

The invention relates to a remotely controlled unmanned aerial vehicle (UAV), or drone and, more particularly, one embodiment of an ordnance comprises a vehicle and an explosive component for delivery to a target.

BACKGROUND

All too often members of a military force carry missiles in the field and launch them to attack an enemy without being able to assure there will not be collateral damage to innocent people. Similar concerns persist for grenades. Moreover, regardless whether the explosive weapon is thrown or launched, once the projectile is air-borne, the person sending it loses ability to personally control the trajectory and cannot alter the destination. It would be advantageous to provide a system which is light and compact enough to be carried in a back pack, but which can also be steered to a destination.

SUMMARY OF THE INVENTION

In view of the foregoing and other exemplary problems, drawbacks, and disadvantages the conventional systems, it is an exemplary aspect of the present invention to provide a remotely controllable aeronautical ordnance capable of loitering.

It is, therefore, an exemplary feature of the present invention to provide a structure and method for delivering an ordnance from a first altitude to a destination on or above a ground plane.

In a first exemplary aspect of the invention, to achieve the above and other features and purposes, described herein is a method of delivering an explosive ordnance from a first altitude to a destination on or above a ground plane and avoiding collateral damage. The method includes providing an ordnance which includes a tubular shaped body having first and second opposing end portions and an explosive component positioned therein, a plurality of blades connected to the body at or near the first end portion blades for rotation about the body under powered operation to impart thrust and bring the ordnance to a first altitude above a target position, a motor positioned within the tubular shaped body, connected to selectively provide the powered operation to impart the thrust and thereby provide propulsive lift to the ordnance via the blade rotation, an imaging device mounted along the second end portion to generate frames of image data representative of a view of a ground plane while the ordnance is airborne, where the imaging device acquires infrared or visible light images, first receiver circuitry configured to receive radio frequency (rf) control signals and coupled to effect operation of other components of the ordnance in response to the received signals, rf video transmission circuitry coupled to receive the frames of image data and transmit rf signals including a stream of the image data. The method also includes providing a user controllable remote control device, positionable remote from the ordnance, which includes rf control circuitry that, responsive to user input, transmits control signals for a person to direct operation of the ordnance when flying and hovering, second receiver circuitry for receiving the stream of image data, and video processing circuitry that receives the image data from the rf circuitry and displays the image data on a screen where when the ordnance is airborne above a ground plane, the blades are positioned above the motor and are connected to the motor via a shaft for rotation about a central axis, and the imaging device is oriented to generate frames of image data representative of a view of a portion of the ground plane directly below the ordnance. The method further including initiating the powered operation to impart the propulsive lift to the ordnance, based on displayed frames of the image data acquired with the imaging unit positioned on the ordnance, sending one or more first control signals from the remote control device to navigate movement of the ordnance to an airborne position above the target position, sending one or more second control signals from the remote control device to cause the ordnance to descend toward the target position, and detonating the explosive component.

In another exemplary aspect of the invention, the ordnance includes a mechanism by which the user may, via an operation performed on the remote control device, cease motor operation of the ordnance to drop the ordnance from the first altitude and toward the target position.

Another exemplary aspect of the invention is an embodiment where the powered descent is effected by transitioning the blade from a lift or hover mode to a descent mode by reversal of blade direction of rotation to accelerate descent.

Another exemplary aspect of the invention is an embodiment where the step of sending the one or more second control signals ceases provision of blade rotation, causing the ordnance to descend under gravitational force toward the target position.

Another exemplary aspect of the invention is an embodiment where the step of sending the one or more second control signals causes the ordnance to hover directly above the target position before descending on the target position.

Another exemplary aspect of the invention is an embodiment where the step of detonating the explosive component is effected with an impact fuse when the ordnance strikes a surface.

Another exemplary aspect of the invention is an embodiment where the step of detonating the explosive component is effected at or near the target position without actuation of an impact fuse.

Another exemplary aspect of the invention is an embodiment where the ordnance further includes a detonator switch operable to detonate the explosive component and, if the user of the remote control device desires to detonate the explosive component without requiring use of an impact fuse, the step of detonating comprises operating the detonator switch with a third control signal transmitted from the remote control device to detonate the explosive component at or above the ground plane.

Another exemplary aspect of the invention is an embodiment where the ordnance further includes a detonator switch operable to detonate the explosive component and, if the explosive component fails to detonate on impact, the step of detonating comprises operating the detonator switch with a third control signal from the remote control device to detonate the explosive component.

Another exemplary aspect of the invention is an embodiment where the ordnance is deployed while being hand held by an operator.

Another exemplary aspect of the invention is an embodiment where the ordnance is deployed by powering the ordnance while the operator holds the ordnance and then controls movement of the ordnance via the remote control device.

Another exemplary aspect of the invention is an embodiment where the operator observes the current position of the ordnance over the ground plane by looking at the display on the remote control device, when the operator identifies a target beneath the ordnance via the display, the operator uses the remote control device to stop power to the blades, enabling the ordnance to drop directly upon the selected target, and upon impact with a surface along the target position, the explosive detonates.

Another exemplary aspect of the invention is an embodiment where the ordnance descends from the first altitude in a vertical direction, relative to the ground plane, to the target position.

Another exemplary aspect of the invention is an embodiment where the powered operation deploys the blades from collapsed or retracted positions to expanded positions for rotation and provision of the lift.

Another exemplary aspect of the invention is an embodiment where the blades are spring loaded to effect deployment to expanded positions.

Another exemplary embodiment includes a tubular shaped body having first and second opposing end portions, a plurality of deployable blades connected at or near the first end portion to the body which, when deployed, are rotatable about the body to impart thrust and bring the ordnance to a first altitude above a target position, a motor attached to the tubular shaped body portion and connected to selectively provide power to rotate the blades after the blades are deployed, an explosive attached to the tubular shaped body, a switch connected to drop the ordnance from the first altitude and on to the target, and a camera positioned to generate a view from the ordnance of a portion of the ground plane where, when the ordnance is deployed, flight of the ordnance is controllable with a remote control device to steer the ordnance to a position above the target and drop the ordnance on the target.

Another exemplary aspect of the invention is a system including a microprocessor-based subsystem operatively connected to control steering and operation of the ordnance, including operation the motor and the camera, and adjustment of the blades for steering, and the remote control device, said device capable of transmitting data to and receiving data from the microprocessor-based subsystem via a rf link to effect control of the operation of the ordnance, including the function of the switch to drop the ordnance from the first altitude.

Another exemplary embodiment includes an ordnance for movement above a ground plane, including an upper case, a lower case attached to a bottom portion of the upper case, a plurality of deployable coaxial blades connected to the upper case such that, when deployed, are rotatable about the body to impart thrust and bring the ordnance to a first altitude above a target position, a motor attached to upper case and connected to selectively provide power to rotate the blades so as to allow vertical take-off and flight, a payload attached to the lower case, an imaging system attached to the lower case and positioned so as to generate a view from the ordnance of at least a portion of the ground plane, and a receiver configured to receive a remote signal such that, when the ordnance is deployed, flight of the ordnance is controllable via the remote signal so as to steer the ordnance to a position above the target position.

Another exemplary aspect of the invention is an embodiment where the payload includes an explosive.

Another exemplary aspect of the invention is an embodiment where the blades are configured so as to retract when rotation of the blades ceases.

Another exemplary aspect of the invention is an embodiment where the payload includes at least one of a nuclear detector, a chemical detector, a biological agent detector, a phosphorus payload, a chemical payload, or a lighting system configured to illuminate an area around the ordnance.

BRIEF DESCRIPTION OF THE DRAWINGS

The foregoing and other purposes, aspects and advantages will be better understood from the following detailed description of embodiments of the invention with reference to the drawings, in which like numbers are used throughout the figures to denote like components:

FIG. 16 illustrates an exploded view of the sniffer head;

FIG. 17 illustrates a cross section view of the sniffer head taken along line 17-17 of FIG. 12;

FIG. 22 illustrates a front view of an illumination head;

FIG. 23 illustrates a side view of the illumination head;

FIG. 24 illustrates a top view of the illumination head;

FIG. 25 illustrates a bottom view of the illumination head;

DETAILED DESCRIPTION OF THE INVENTION

Figure 1:
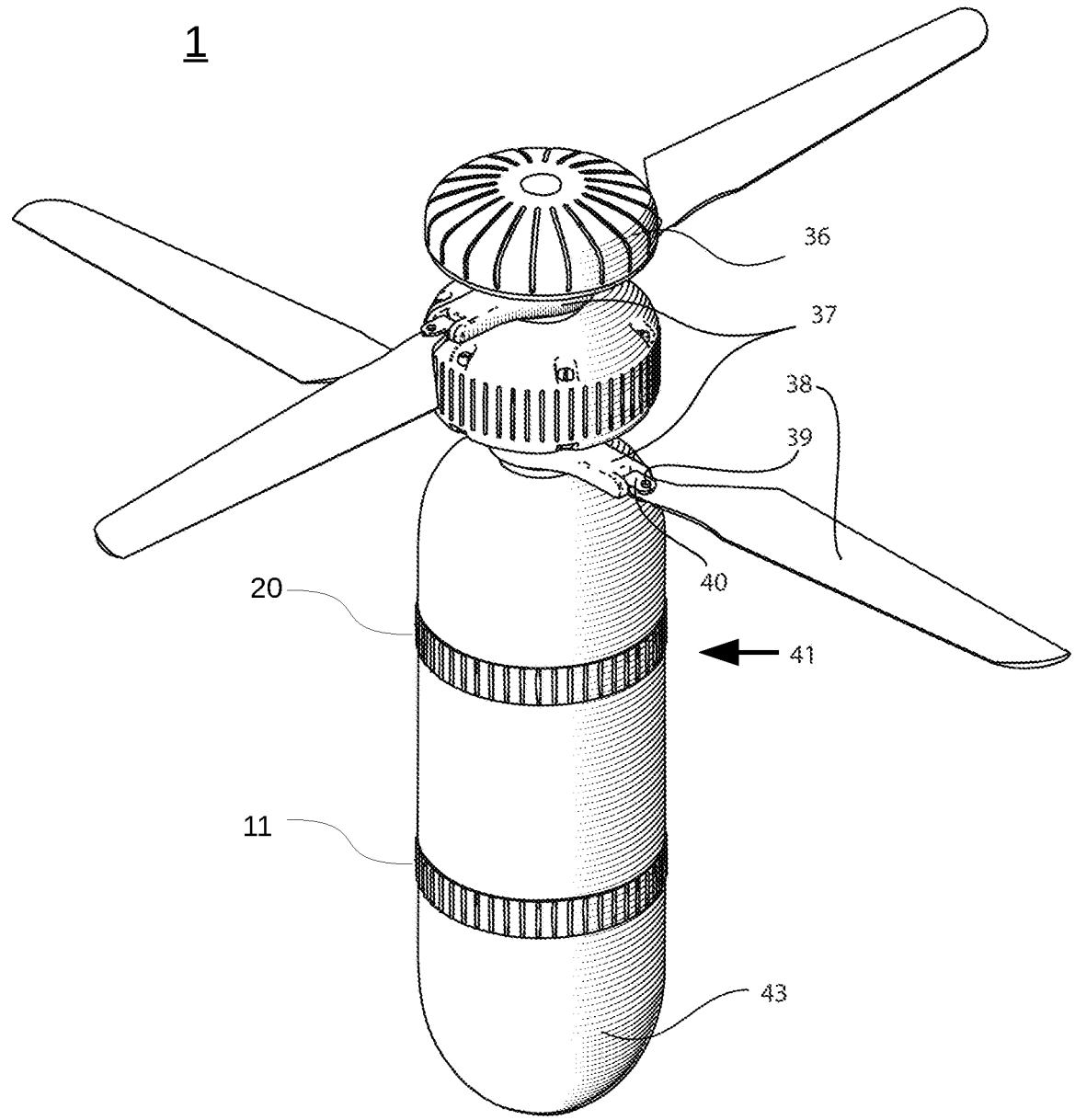
FIG. 1 illustrates a perspective view of an embodiment of the present invention with blades in an extended position.

Referring now to the drawings, there are shown exemplary embodiments of the method and structures according to the present invention.

The illustrated embodiments of an ordnance 1 combine a payload with an unmanned flying device, referred to a coaxial drone, similar to that described in U.S. Pat. No. 10,093,417, assigned to Ascent AeroSystems, LLC. In other embodiments, the ordnance 1 may include other designs of an unmanned aerial vehicle (UAV) suitable for delivery to a target. In lieu of an explosive weapon carried and launched by an air-borne vehicle or the "dropping" of a payload carried by such a vehicle, the ordnance 1 includes an integrally formed UAV function for which flight is controllable in the field to reach a selected altitude and position above a target. Once positioned, the ordnance 1 can be controlled to drop in its entirety on the target.

Figure 2:
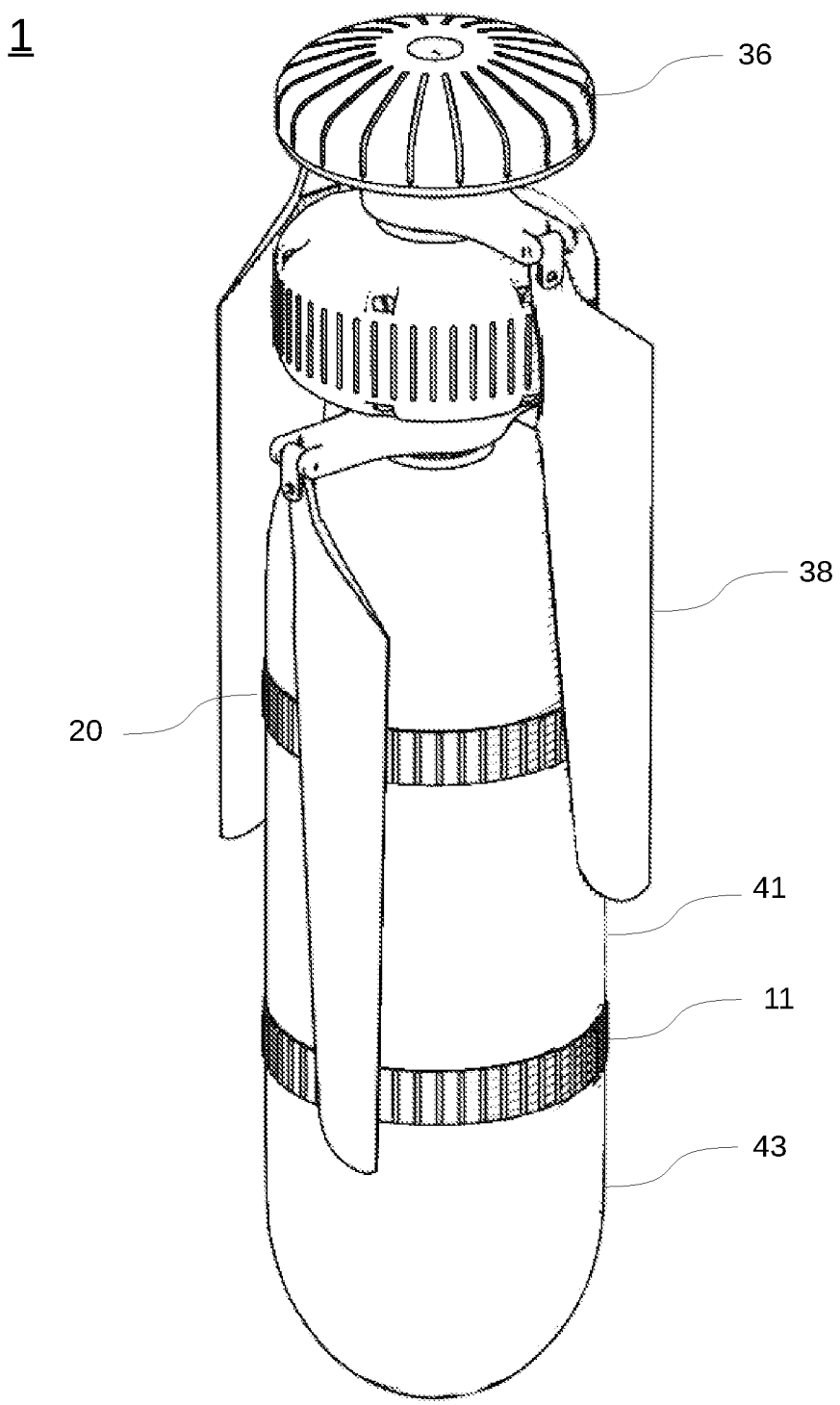
FIG. 2 illustrates a perspective view of the embodiment of FIG. 1 with blades in retracted position.
Figure 3:
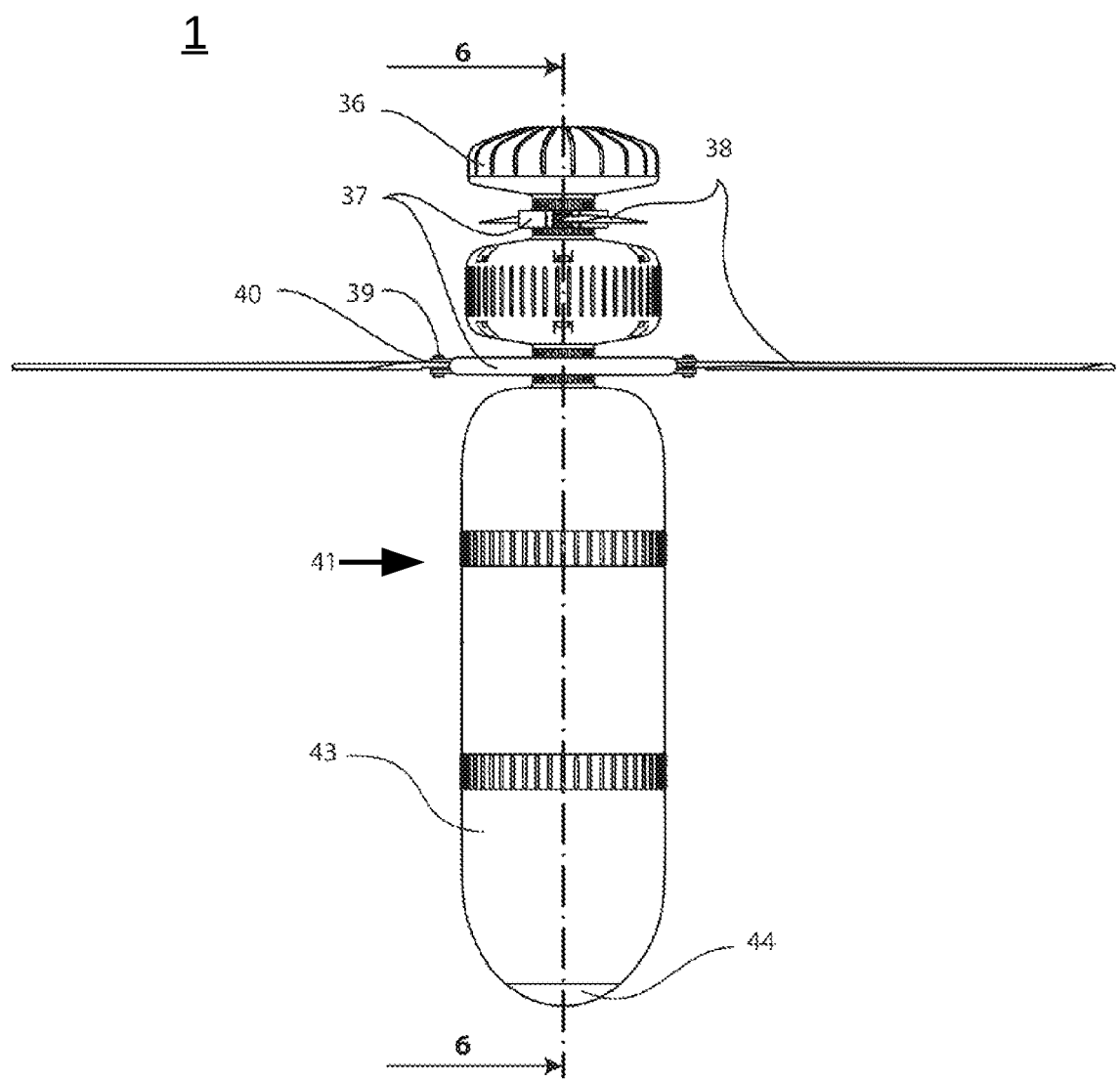
FIG. 3 illustrates a front view of the embodiment of FIG. 1.
Figure 4:
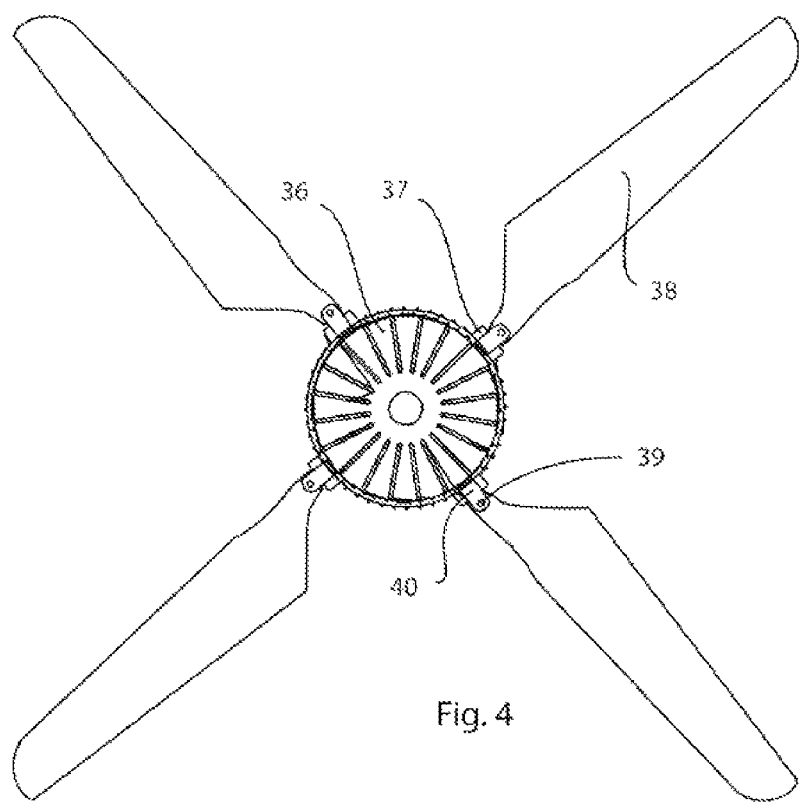
FIG. 4 illustrates a top view of the embodiment of FIG. 1.
Figure 5:
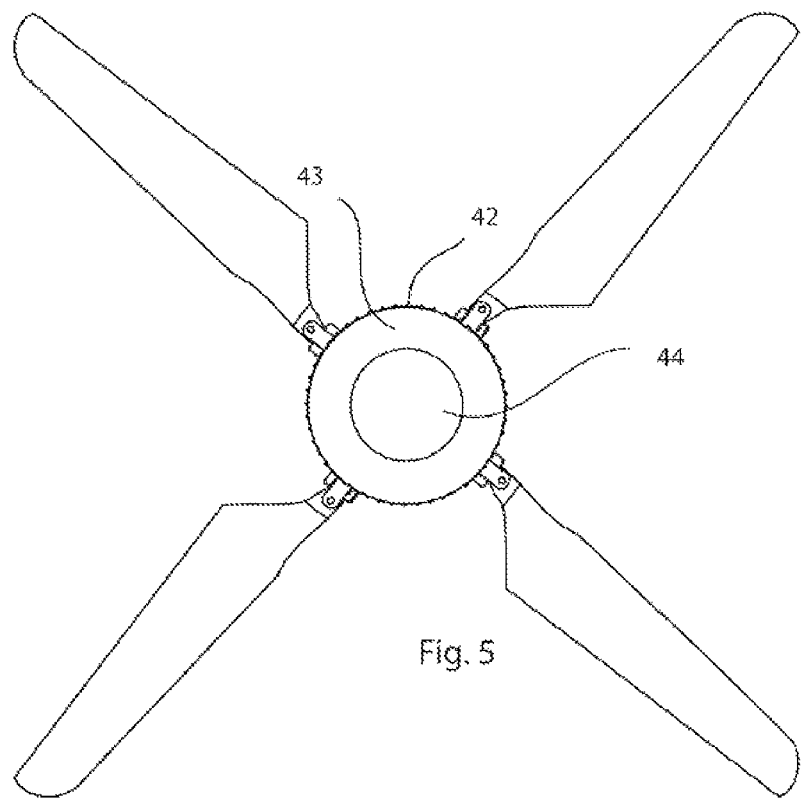
FIG. 5 illustrates a bottom view of the embodiment of FIG. 1.

FIG. 1 provides a view of the ordnance 1 in a powered-up configuration with propellers/rotary blades 38 extended for flight. The ordnance comprises an upper case 41 and a lower case 43. FIG. 2 provides a view of the ordnance 1 with blades 38 retracted. FIGS. 1-3 illustrate positioning of the ordnance 1 components, with the upper case 41 having a first, upper, end portion 5 positioned above a second, lower, opposing end portion 6 of the upper case 41 when the ordnance 1 is in a deployed vertical orientation relative to a ground plane. FIGS. 4 and 5 illustrate the ordnance from a top and bottom view, respectively.

Figure 6:
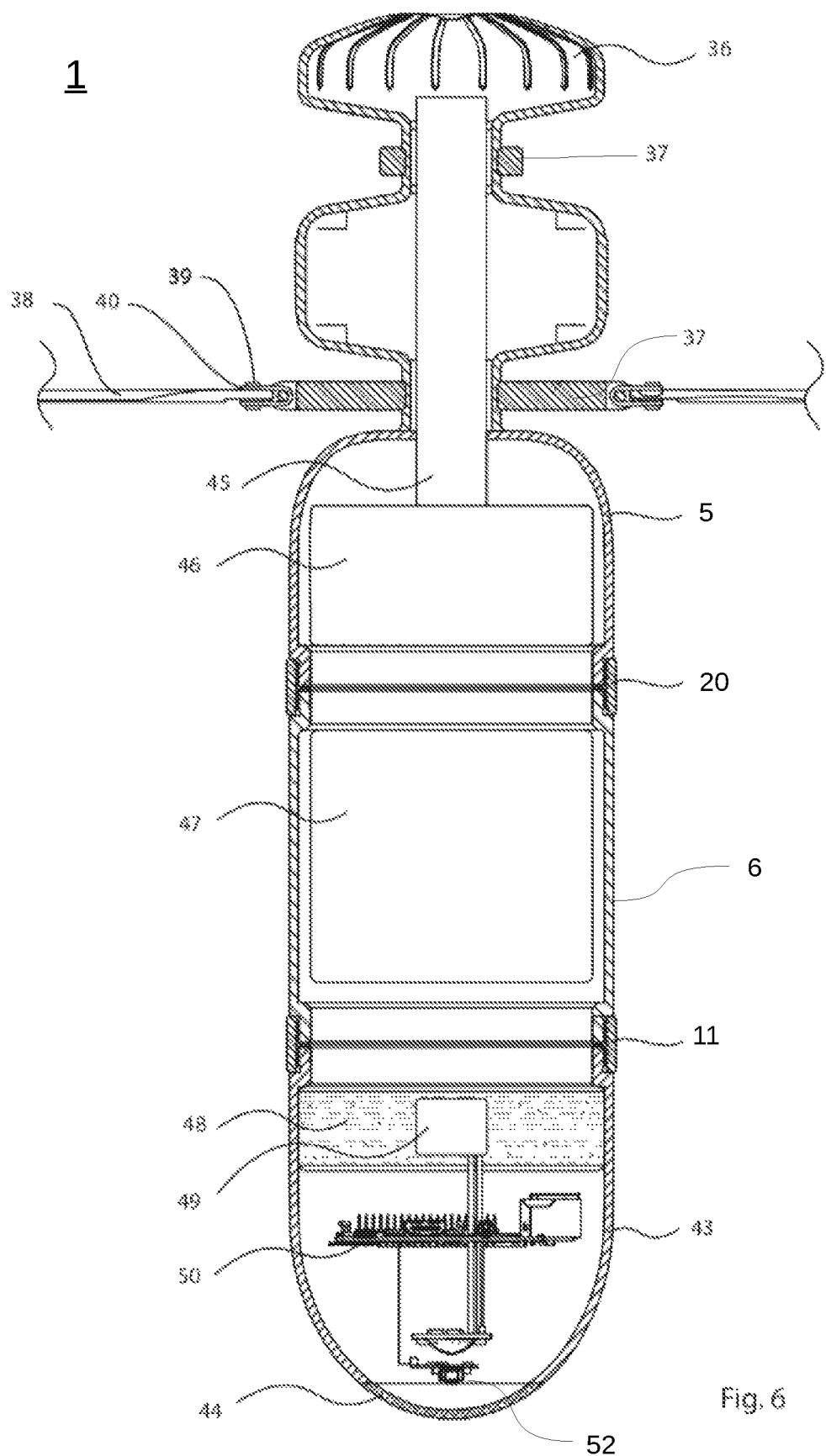
FIG. 6 illustrates a cross section view of the embodiment of FIG. 1 taken along line 6-6 of FIG. 3.

As shown in FIG. 6, the upper case 41 contains the motor 46 with the motor shaft 45 extending beyond the first, upper, end portion 5 of the upper case 41, which shaft 45 is coupled to engage the rotary blades 38, also referred to as propellers. The propellers 38 are coupled to the motor shaft 45 via a gear shaft 37. The transceiver 36 and the antenna are mounted above the motor shaft 45 at the upper-most end of the ordnance 1. The battery 47 is shown mounted in the upper case 41 below the motor 46 to power the motor 46 and move the blades 38 from a retracted position to an operating position and then create thrust to lift and steer the ordnance 1. The thermal camera 52 is shown located in a lowest portion of the lower case 43, at a position permitting the camera 52 to capture a field of view along the ground plane. The microprocessor-based system 50 is positioned between the explosive and the thermal camera 52. A dome 44 may cover the camera 52.

Figure 7:
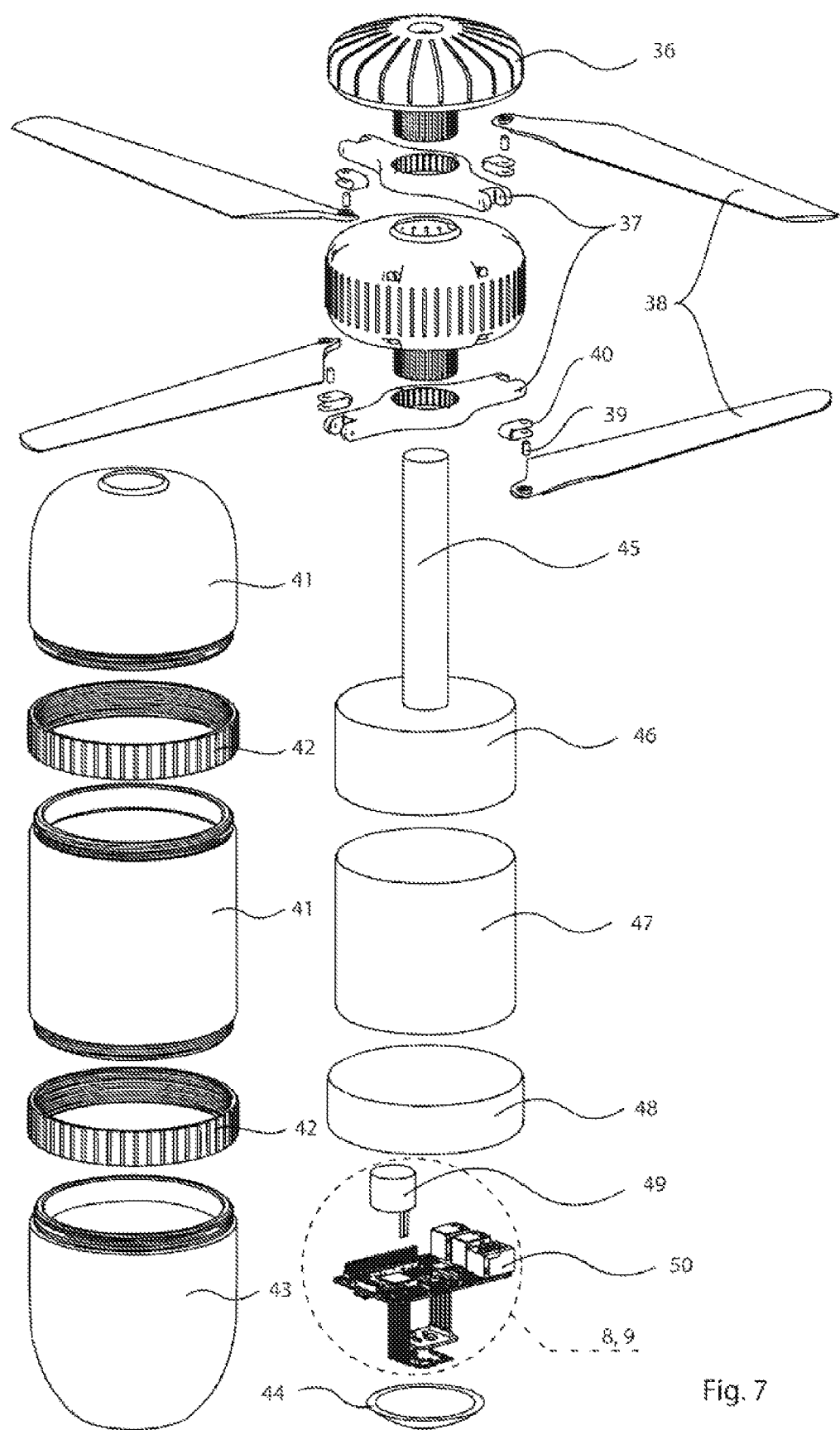
FIG. 7 illustrates an exploded view of the embodiment of FIG. 1.
Figure 8:
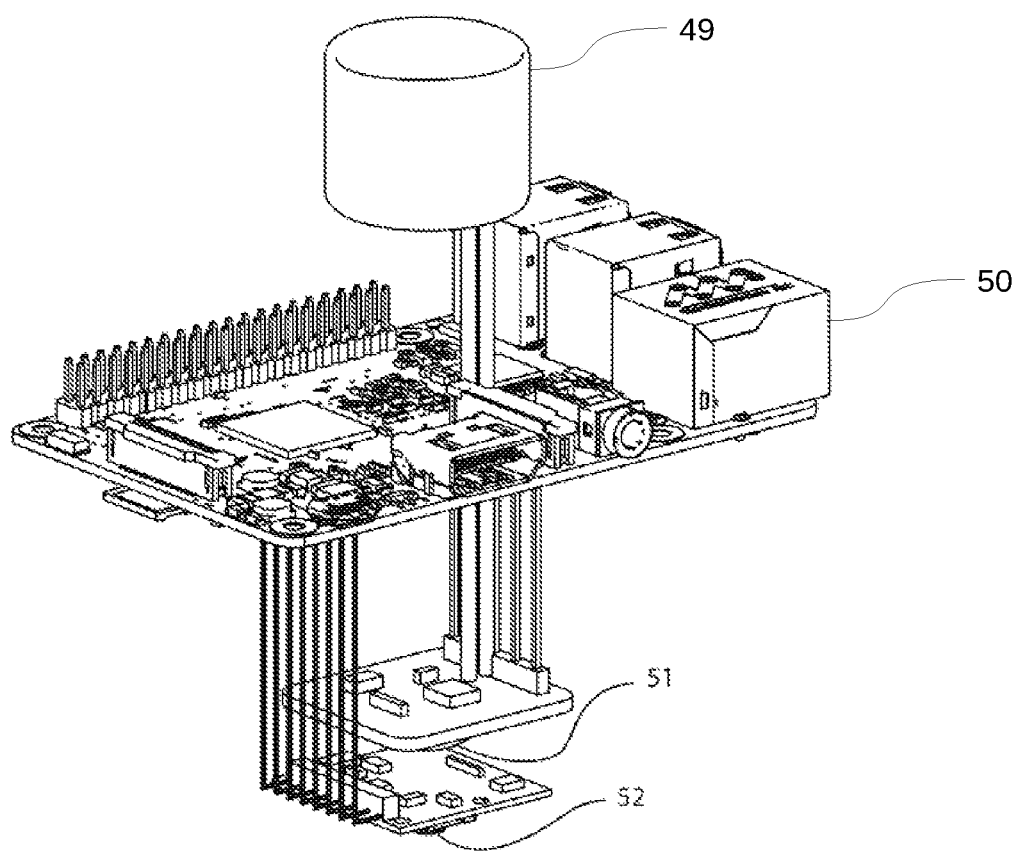
FIG. 8 illustrates a detail view of an embodiment of the CPU controller.
Figure 9:
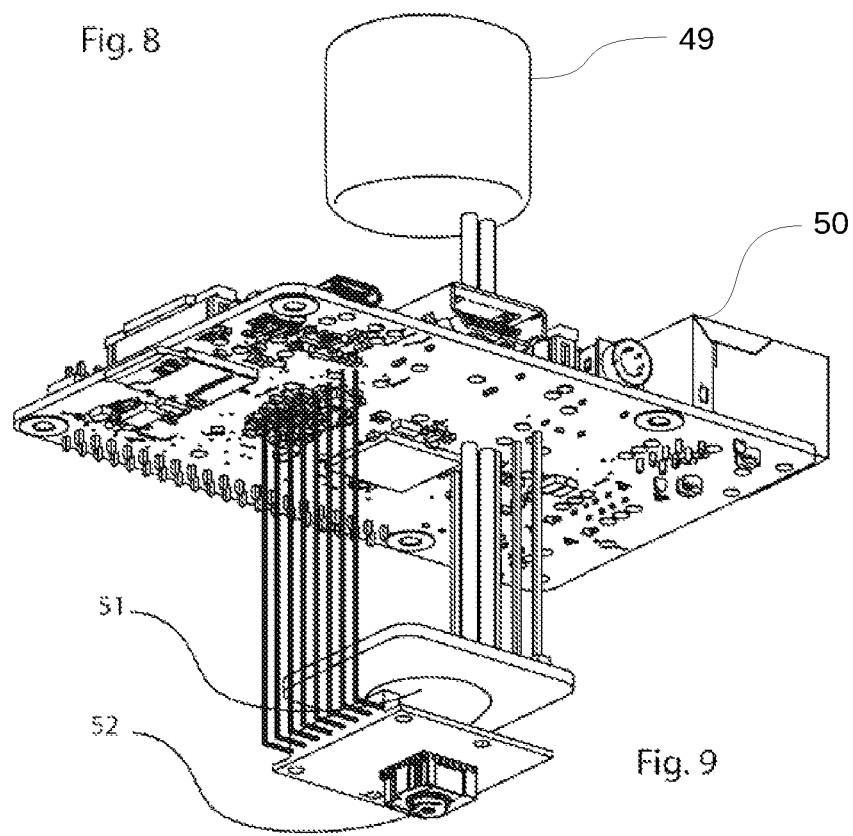
FIG. 9 illustrates another detail view of the CPU controller.
Figure 10:
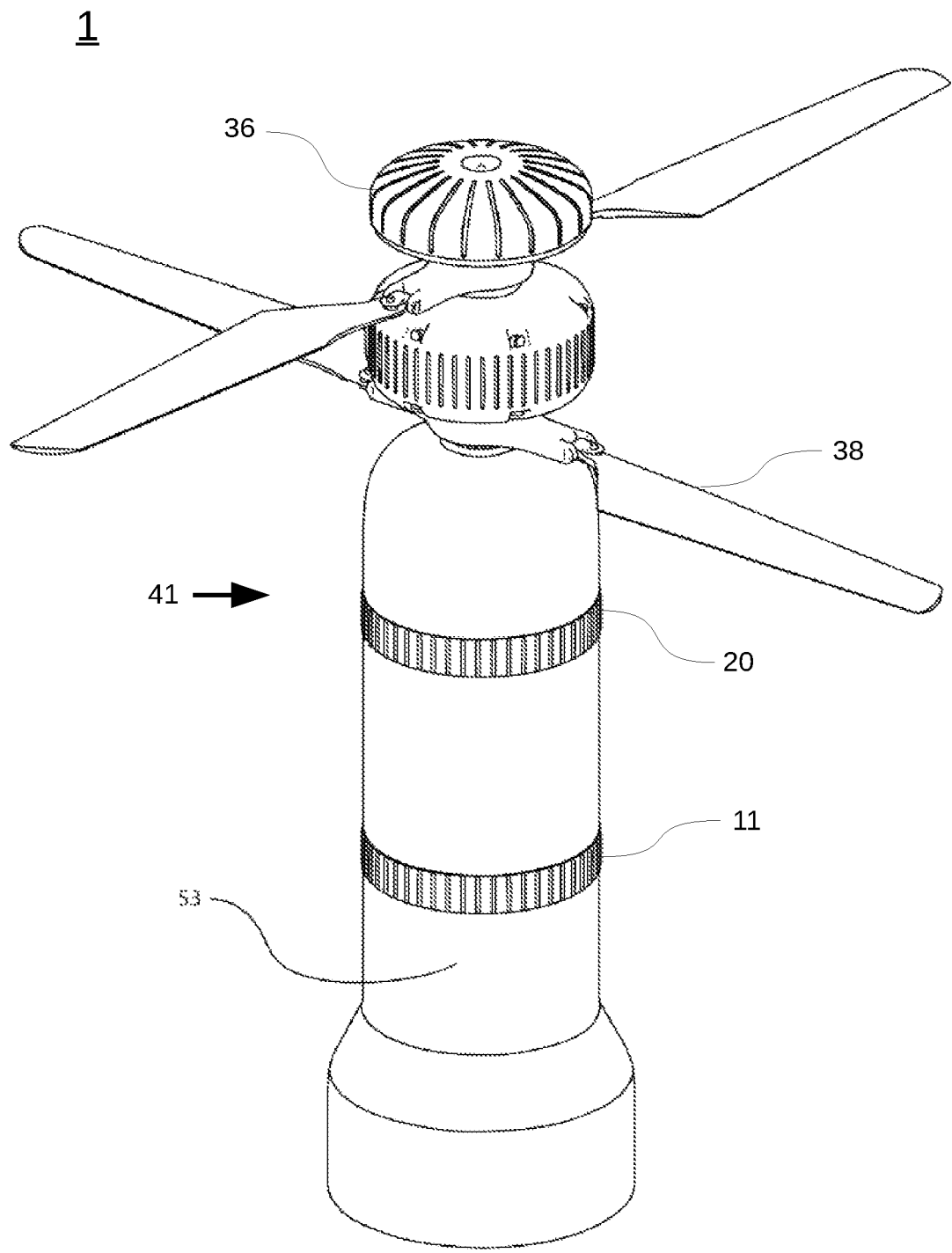
FIG. 10 illustrates a perspective view of an embodiment having a sniffer head.
Figure 11:
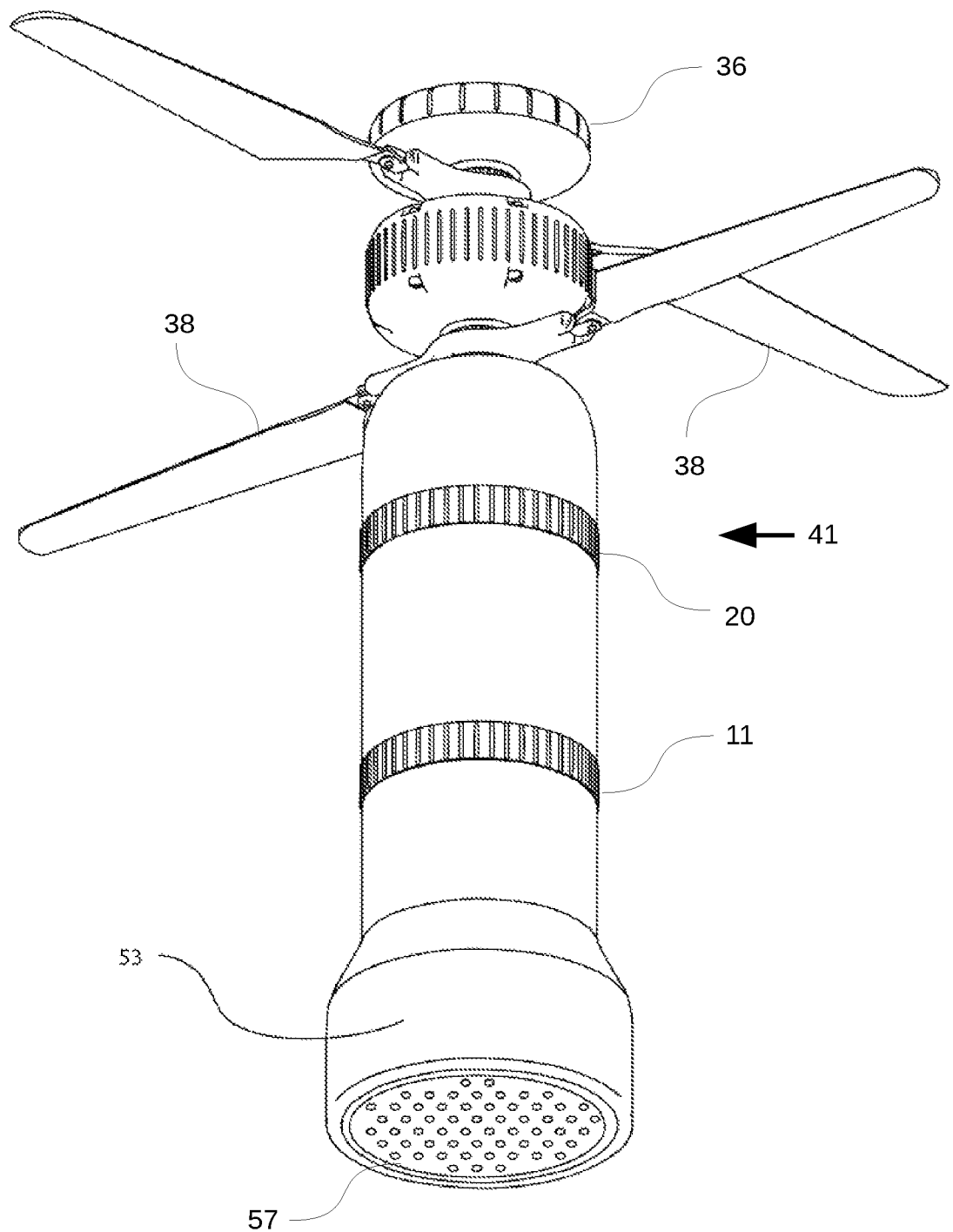
FIG. 11 illustrates another perspective view of the embodiment of FIG. 10.
Figure 12:
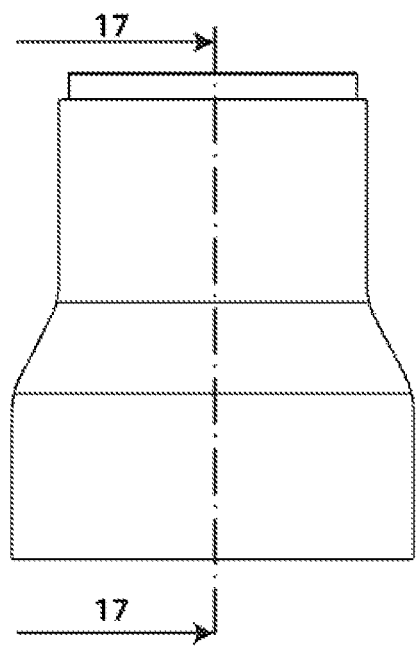
FIG. 12 illustrates a front view of an exemplary sniffer head.
Figure 13:
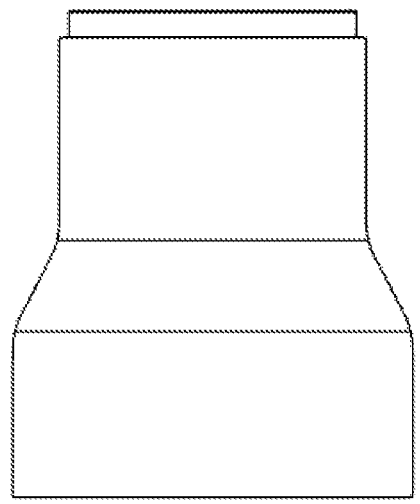
FIG. 13 illustrates a side view of the sniffer head.
Figure 14:
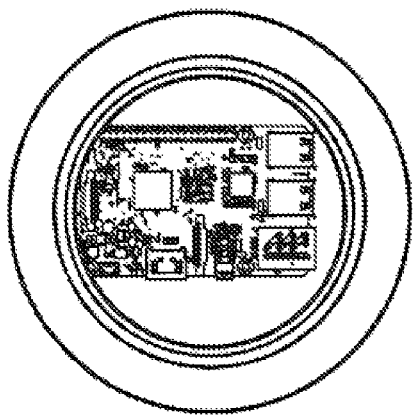
FIG. 14 illustrates a top view of the sniffer head.
Figure 15:
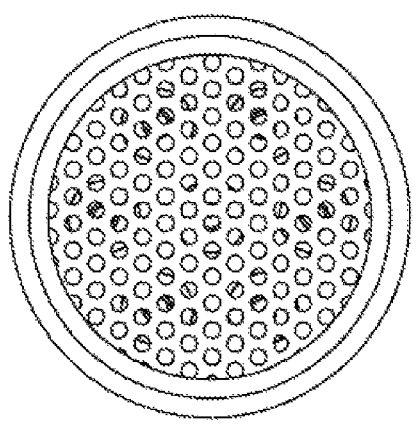
FIG. 15 illustrates a bottom view of the sniffer head.

FIG. 7 provides an exploded perspective view of the ordnance 1 and FIGS. 8 and 9 provide a detailed view of components of the lower case 43, including the microprocessor-based system (CPU/Controller) 50, an impact fuse 49 or a charge ignited by an impact button switch 51, and the thermal camera 52. The button switch 51, which sets off the fuse 49 upon impact with the ground, is located between the microprocessor-based system 50 and the thermal camera 52, but other arrangements and sequences of components may be utilized. The microprocessor-based system 50 is shown housed on a micro-computer board (e.g., a 1 GHz single core CPU, 512 MB RAM, Mini HDMI and USB connectors, a Hat Compatible 40 pin header, a composite video output, a CSI camera connector, Bluetooth and 802.11 WiFi connectivity) which controls a video camera 52 and screen reticule. The system also provides Global Position System (GPS) information. As one example, the camera 52 may be a radiometric-capable Long Wave Infrared (LWIR) camera having one or more focal plane arrays of 80×60 active pixels, an uncooled thermal imager with an enhanced IR sensor and a 50 degree field of view. Material selected for the dome 44 may be a germanium glass, having transparent qualities in the infrared region which, advantageously, serves as the front optic for thermal imaging. In some embodiments, the dome 44 may not be needed so that camera lens protrudes from the lower case 43.

The ordnance 1 is provided for air-borne delivery to a target under remotely controlled in-flight navigation. Navigation may be performed by a person who launches the ordnance 1 from the ground. Video feed generated by camera 52 on board the ordnance 1 may be a video CCD camera, an IR or thermal camera, or other type of imaging device. However, for purposes of description, in the following embodiments the imaging device may be referred to as a thermal camera 52, but is not so limited. Thermal camera 52 is positioned on the ordnance 1 so as to provide views of the ground plane during flight to a remote control device 3. In some embodiments, the camera 52 faces downward toward the ground plane to give a useful view of the target area and assist in aiming or directing descent of the ordnance 1 at a target below.

As can be seen in FIG. 1, the ordnance 1 includes a receiver or transceiver 36 for receiving and transmitting flight control data, imaging, payload control, and any other data which is desired to be transmitted to or from the ordnance 1.

The exemplary portion of the ordnance 1 which provides the function of a UAV, includes the upper case 41 in the form of an axially symmetric tubular body having the first and second opposing end portions 5 and 6. In some embodiments, the first upper end portion 5 and second lower end portion 6 of the upper case 41 are connected to one another with a first coupling 20. First coupling 20 may include a threaded portion for removable mating connection of the upper case 41 to the lower case 43. Alternately, the function of the coupling 20 may be effected by clamping or use of fasteners, or a non-removable connector means. The upper case 41 may be formed of ABS tubing.

The deployable rotary blades 38 are connected at or near the first upper end portion 5 of the upper case 41. A motor 46 is also positioned in the first upper end portion 5 of the upper case 41. Operation of the motor 46 may be controlled by the remote control device 3 with power by via connection to the adjoining battery unit 47. With the remote control device 3 to selectively generate variable levels of electrical power, the motor 46 is operable to deploy and rotate the blades 38 with variable levels of thrust. When deployed, the blades 38 rotate about the upper case 41 to impart thrust, in order to travel along the ground plane and bring the ordnance 1 to a first altitude above a target position.

In the embodiment illustrated in FIGS. 1-9, blades 38 are positioned on two vertical levels around a central axis of rotation, but other well-known blade configurations may be implemented. The blades 38 may include a biasing unit or spring device 40 connected by a pin 39, which enables the blades 38 to extend from a retracted position once deployed. This allows the ordnance 1 to be more easily transported when not in use.

Once the ordnance 1 is in a desired position above the target, the remote control device 3 can disengage rotary power, causing the blades 38 to cease rotation and retract, thereby causing the ordnance 1 to travel downward under the force of gravity toward the target, effectively as a bomb. In other embodiments the system generating the rotary power may be configured to allow the blade rotation to be operated in reverse so that the motor powers the ordinance 1 downward toward a target without the blades 38 retracting. Summarily the blades may be retracted for a more silent and low drag approach by the ordinance 1 toward the target, or the blades may be powered with downward thrust for a more energetic and rapid approach, depending on the particular mission and payload.

The payload may be an explosive 48, a chemical/biological/radiological detection unit, a lighting unit such as an LED array, an electro-magnetic pulse device, or other useful payload depending on mission requirements. The exemplary payloads may be disposed in lower case 43. The lower case 43 may be modular or removable to enable changing to a different type of payload.

The explosive component 48 of the ordnance 1 may be in the shape of a cylinder housed within a cylindrically symmetric lower case 43, attached to share a common axis of symmetry with the upper case 41. The lower case 43 of the ordnance 1, positioned below the second, lower, end portion 6 of the upper case 41, is attached to the upper case 41 via a second coupling 11. Second coupling 11 may include mating threads or the function may be effected with other coupling means such as described in relation to coupling 20. The lower case 43 may also be formed of ABS tubing. In the illustrated arrangement, the battery 47 is positioned in the second, lower, end portion 6 of the upper case 41, below the motor 46, and the explosive component 48 is housed in the upper portion of the lower case 43.

Referring to FIGS. 7-9, an electronic control unit 50, including, for example, a microprocessor-based system, is positioned in the lower case 43, below the explosive component 48. The thermal camera 52 is mounted below the microprocessor-based system 50 in a lower-most portion of the lower case 43, housed in a section of the lower case 43 having a transparent dome 44. The dome 44 enables the camera lens to provide a wide angle field of view over the ground plane during flight. During flight of the ordnance 1 the camera 52 images portions of the ground or ground structures of interest for display on a remote control device 3 via a radio frequency link. A person navigating the ordnance 1 with the remote control device 3 is able to steer the ordnance 1 along the ground plane to a selectable position above a target.

The microprocessor-based system 50 may include a CPU and other control and memory systems. The microprocessor-based system 50 may allow certain flight attributes to be handled, autonomously or otherwise, to provide aid in flight, obstacle avoidance, autopilot, target detection, aiming to target, swarming capability, and any other suitable function which may be performed by a computer system.

The explosive component 48 may be detonated with the impact fuse 49 (e.g., formed of a combination of ammonium nitrate and a metal such as an aluminum powder to explode under the force of an impact). The impact fuse 49 may also be connected to a button/switch 51 to trigger the detonation.

In one exemplary embodiment, the material serving as an impact fuse 49 is sold as an electronically detonated blasting cap M6 Assembly which also has an aluminum alloy cup containing an ignition charge which acts as the button/switch. The charge consists of smokeless powder, potassium chlorate and lead salt of dinitro, ortho cresol and a base charge of RDX (O2NNCH2)3. Two lead wires, connected by a bridge wire (which creates a spark) in the ignition charge, extend through a rubber (or rubber and sulfur) plug assembly in the open end of the cup which serves as the button/switch 51 in this configuration. Two circumferential crimps secure the plug assembly in the cup. In addition, button/switch 51 may include an electronic detonation circuit to allow the impact fuse 49 to be triggered without requiring an impact of the ordnance 1 with the ground or other object. Such a detonation circuit would be responsive to a command issued by the remote control device 3 to detonate the fuse 49 and explosive component 48. The component 48 detonated by the impact fuse 49 may be a plastic explosive (e.g., Composition C-4) or a combination of either ammonium nitrate or ammonium perchlorate with a metal such as Al.

Figure 36:
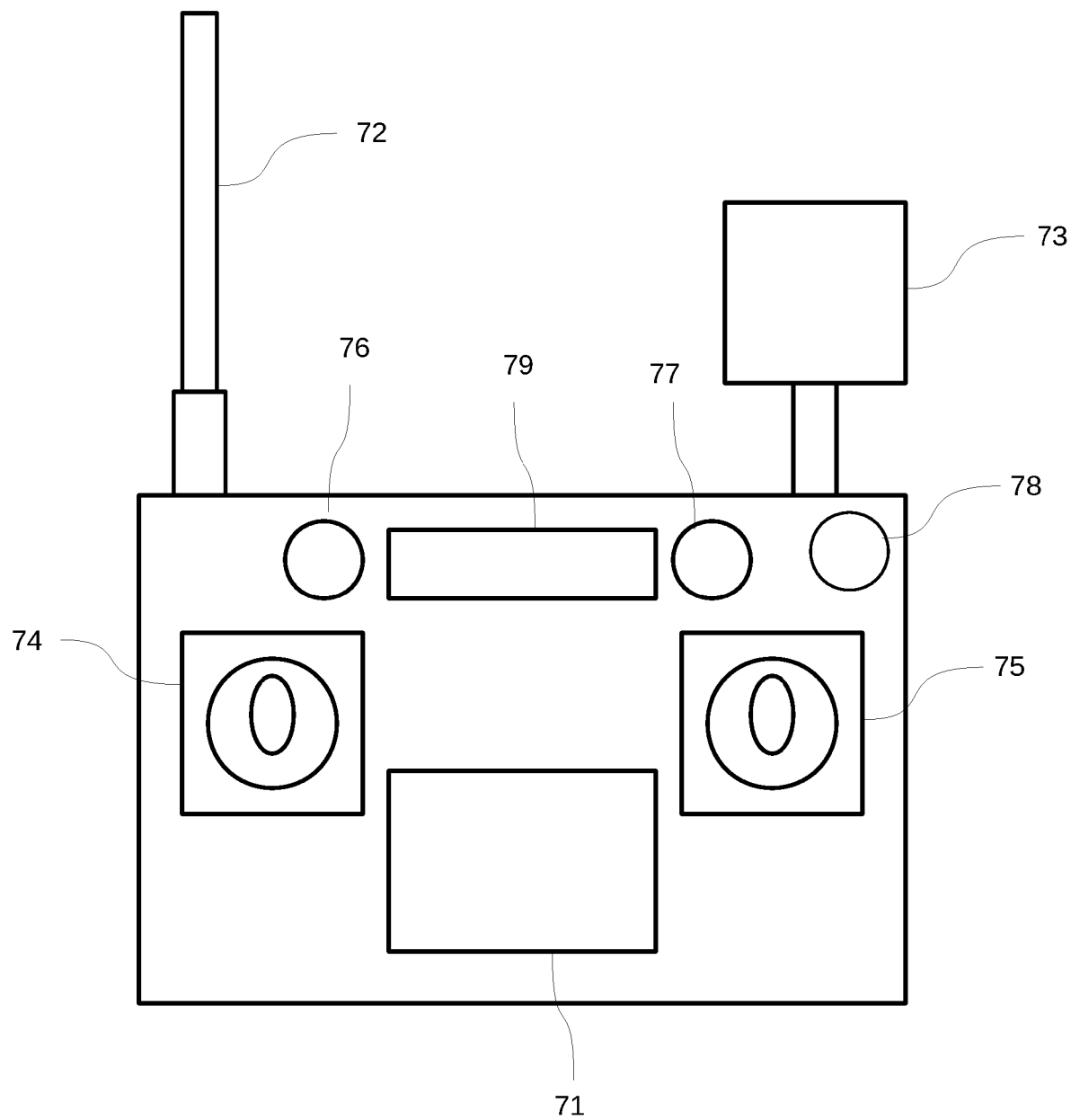
FIG. 36 illustrates an exemplary embodiment of a remote control device.

The design and functionality of the remote control device 3 are not particularly limited and are capable of communicating, directly or indirectly, with the ordnance 1. For instance, the remote control device may be a smart phone, a single or multiple bandwidth remote, a defence system, or any other appropriate means of control. FIG. 36 illustrates a commercially available remote control device 3 which may include a display 71 for showing images from the camera 52, a first antenna 72 which broadcasts at a first frequency (e.g., 2.4 G Hz) and a second antenna 73 which broadcasts at a second frequency (e.g., 5.8 G Hz). The illustrated device 3 includes a throttle/rudder control stick 74 and an elevator/aileron stick 75. Device 3 also includes a power button 76, a start button 77, a gimbal control 78, a secondary display 79, and may have various other controls for specialized functions.

The ordnance 1 is useful in a battle environment or in the presence of snipers where there is heightened danger of visual exposure when attempting to observe the location of an adversary. In an exemplary embodiment, the ordnance 1 comprising the coaxial drone can be carried in a backpack; can be launched from the hand; and can be remotely flown over a target while providing a real-time video feed of a view of the target with thermal imagery. Once the target is seen in the thermal image and the ordnance 1 is positioned directly above the target, a button command on the remote control device 3 is activated to stop the rotary blades 38 and cause the drone to drop under the force of gravity, as a bomb, onto the target and explode upon impact.

An ordnance has been described which, when launched by militia, is controllable during flight. This enables selection of a destination while in flight and enables the person who has launched the ordnance to change the destination based on information acquired from the ordnance. The disclosed ordnance is relatively light and compact, suitable for being carried in a pack. In one design, the ordnance is limited in length to 20 inches (51 cm) is powered with a battery 47 for 30 minutes of flight time while carrying a two kg payload.

In this embodiment, the ordnance 1 is deployable by hand. For example, a soldier-operator may manually turn on the power to begin rotating the rotary blades 38 for a launch, and then the operator may control movement of the ordnance 1 via the radio frequency (rf) driven remote control device 3. While the ordnance 1 is in flight, the operator may observe its position over the ground by looking at a monitor on the remote control device. Display is based on a live feed from the ordnance 1. When the operator sees a target beneath the ordnance 1, the remote control device 3 is used to immediately stop and collapse the rotary blades 38, which in some embodiments may be spring loaded via a baising device or spring 21, enabling the ordnance 1 to drop directly upon the selected target. Upon making contact with a surface of the target, the impact fuse 49 sets off the explosive with assurance of minimizing collateral damage. The remote control device 3 can be used to detonate the explosive 48 if a need arises to avoid creating explosive damage on the ground.

The invention enables soldiers to carry powerful, light weight munitions that can be delivered remotely with precision available through a themal reticle and remote control display 71. The ordnance 1 can be steered through structures, e.g., through open windows, and allowed to descend through shafts and the like, with little to no collateral damage. The ordnance 1 can also be fitted with infrared (LED) lights to provide illumination along the ground plane and assure identification of a target. Also, to facilitate travel to a desired destination, the operator may designate a specific GPS target location and an altitude above the target location. The ordnance 1 may be programmed to automatically drop on that position, even when the GPS coordinates are not in the line of site of the operator. The ordnance 1 can operate with a plethora of fuse types. The fuse type may be substituted to accommodate policy and safety procedures and arsenal compatibility.

Illustrated embodiments include a drone bomb system, a type of unmanned coaxial aerial vehicle designed to engage both line of sight and beyond line-of-sight ground targets with an explosive warhead or other conventional and non-conventional specialized warheads. These embodiments are portable Loitering Munitions, capable of providing ground combatants with a guided or guidable, precision munition. The system is equipped with high resolution electro-optical and/or infrared cameras that enable the targeter to locate, surveil, and guide the vehicle to the target. One advantageous feature of these embodiments is the ability to "loiter" in the air for an extended period of time before striking, giving the targeter time to decide when and what to strike. This feature allows extractions before the munitions are delivered; and allows combatants to compensate for mishaps and ground conditions. This is to be compared to a conventional missile that cannot be recalled or detonated before impact, which may endanger personnel on the ground.

A growing number of operations can benefit from the embodiments of the disclosed loitering munitions, which offer a unique set of new capabilities compared to traditional alternatives such as rockets and mortars. One such benefit is an enhanced ability to discriminate between combatants and noncombatants, compared to weapons such as mortars, rockets, and small missiles. The loitering capability allows users to detect and track potential targets for extended periods of time before a strike. This can minimize collateral damage of non-hostile targets.

Another benefit of the illustrated embodiments is improved precision compared to equivalent weapons. Embodiments create a forward-facing blast that makes targeted detonation more precise than, for example, a grenade, which creates a 360-degree blast. The disclosed loitering munitions are steerable, whereas other munitions are not steerable.

In addition, the "wave off" feature allows operators of the drone bomb system to cancel an attack in mid-flight and abort the munition harmlessly. Traditional rockets, mortars, and missiles do not have this feature. Some embodiments of the invention also provide interchangeable warheads to allow the drone bomb system to be changed from deadly force to non-lethal and strategic uses. One such exemplary embodiment, shown in FIGS. 10-17, includes as a payload a Nuclear Biological and Chemical (NBC) Sniffer Head 53 which may fly through an area and acquire air samples for testing for the presence of NBC contaminants so as to not place personnel entering quarantined areas at risk. Referring to the exploded view of FIG. 16, the Sniffer Head 53 may include a body case 54, a battery 47, a CPU/controller system 50, a grid 56 disposed to help keep mini-vacuums 55 in position adjacent vent 57.

Another exemplary embodiment of the ordnance 1 is shown in FIGS. 18-27, which illustrate a payload having an illumination head 58. The illumination head 58 may be any type of lighting device. In the example shown in FIGS. 18-27, the illumination head 58 includes an umbrella type mechanism 59, a membrane or reflective cover 60, and LED arrays/strips 61. The LED strips 61 may be formed from LED Strip Lights having a 3M™ Adhesive Back with 54 LED lights per strip, each strip extending 36 inches. The strips provide blunt cut connections so that they can be cut to length every three LEDs. The 12V light strip is clear color or Red and is IP67 rated for water and dust resistance. The LEDs can be any color depending on the particular mission. The LED strips 61 may also produce Infrared light to assist with night vision.

Figure 18:
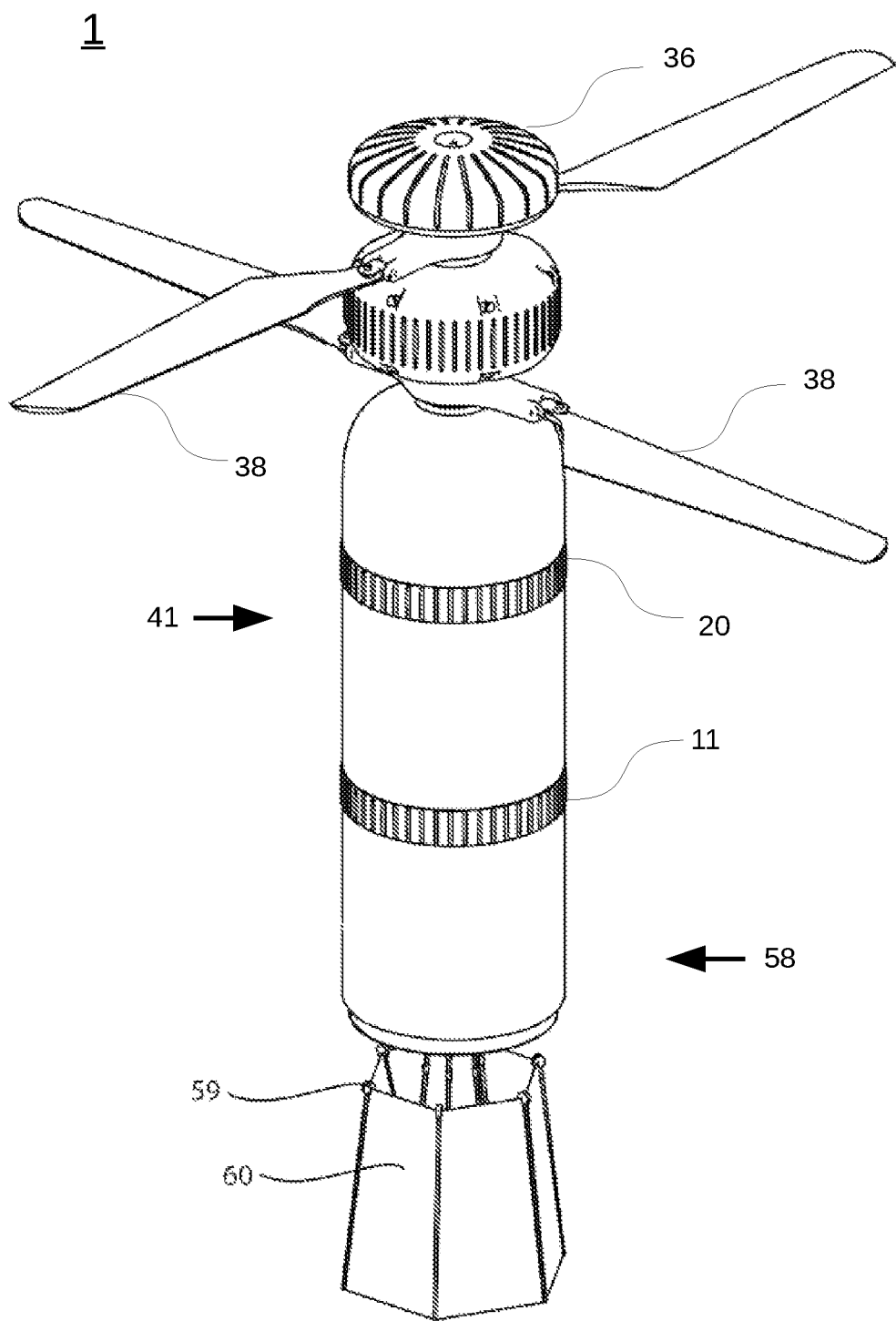
FIG. 18 illustrates a perspective view of an embodiment having an illumination head in the contracted position.
Figure 19:
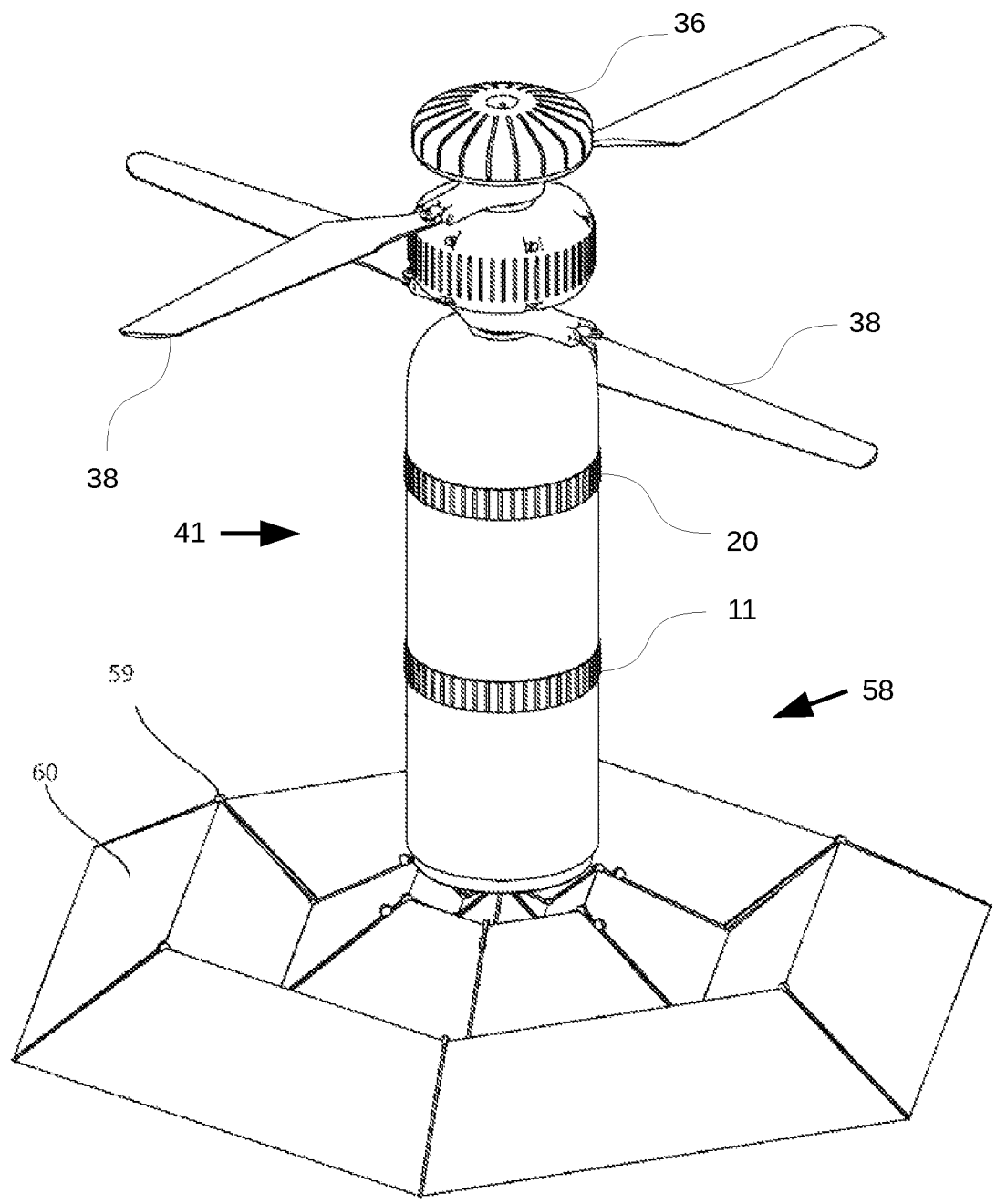
FIG. 19 illustrates a perspective view of the embodiment of FIG. 18 in the expanded position.
Figure 20:
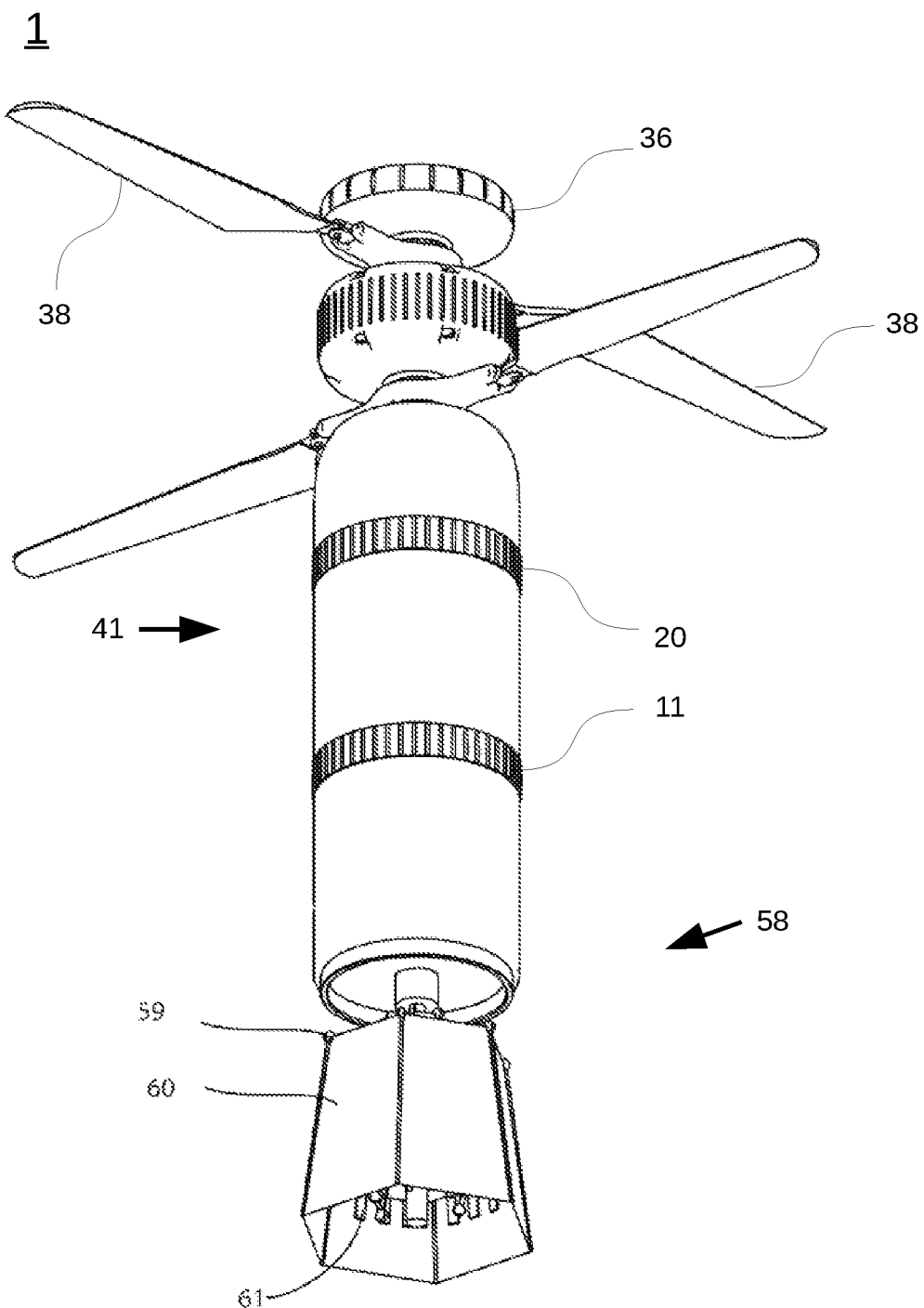
FIG. 20 illustrates another perspective view of the embodiment of FIG. 18 in the contracted position.
Figure 21:
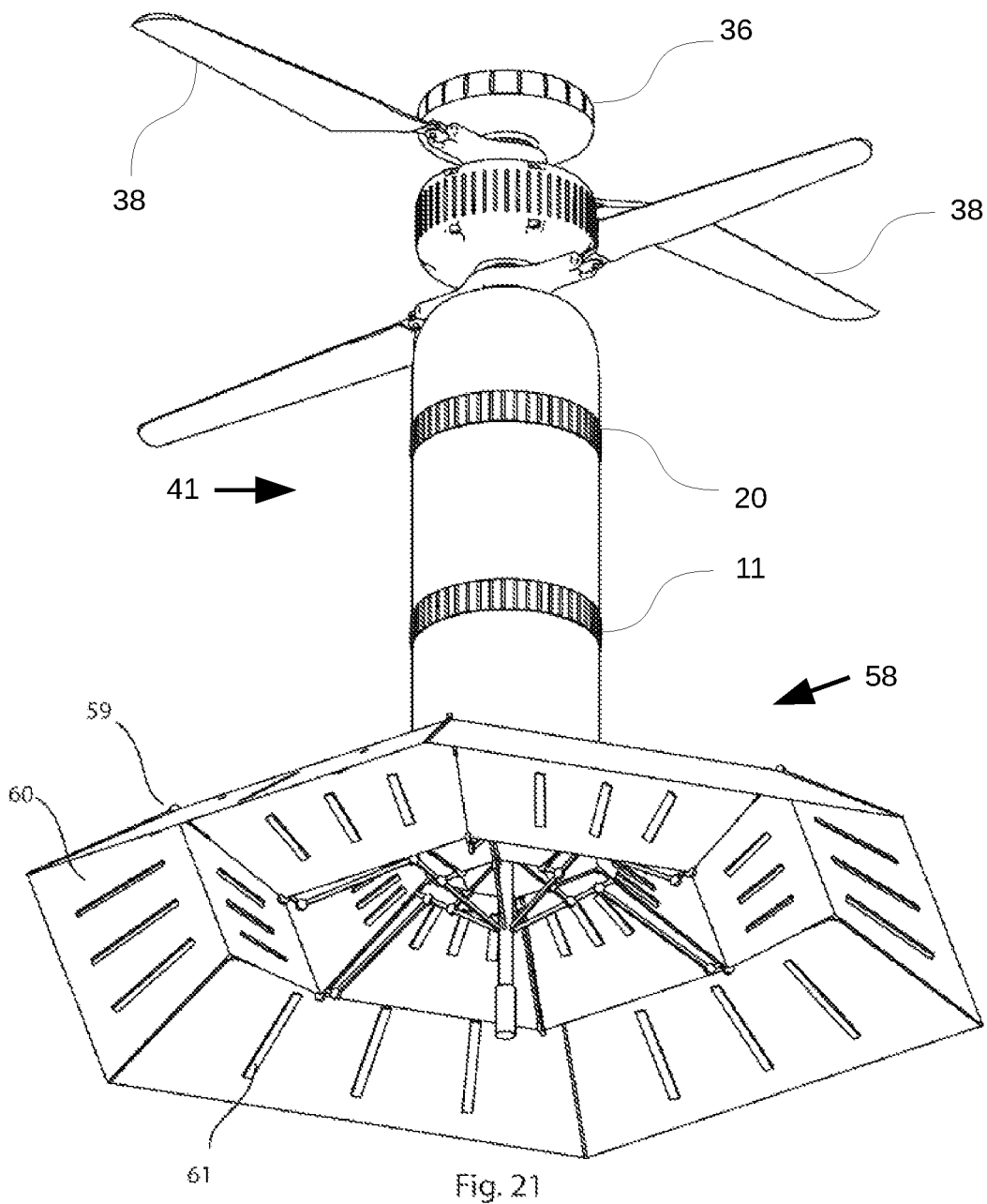
FIG. 21 illustrates another perspective view of the embodiment of FIG. 18 in the expanded position.
Figure 27:
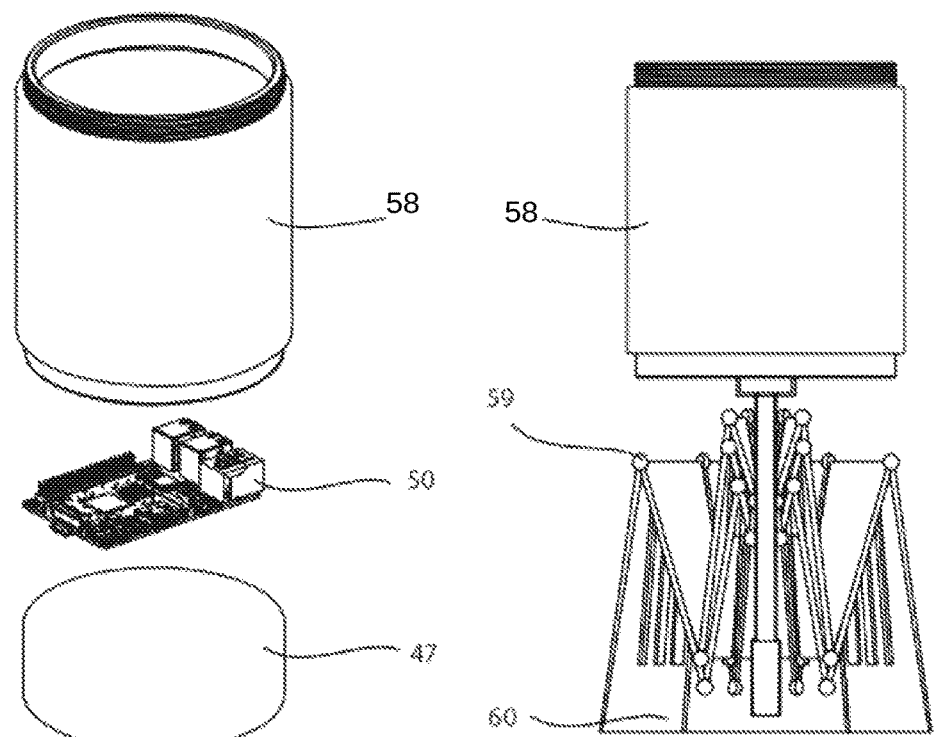
FIG. 27 illustrates a cross section view of the illumination head.
Figure 26:
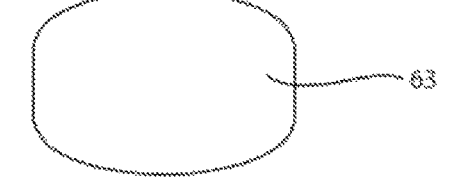
FIG. 26 illustrates an exploded view of the illumination head.
Figure 26:
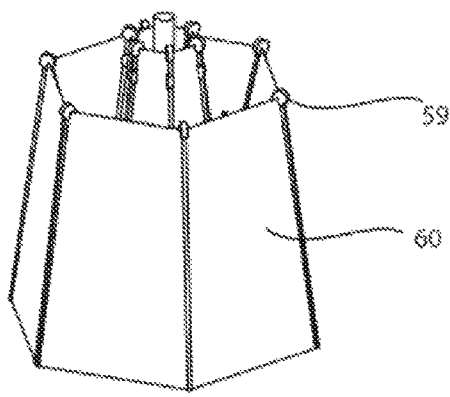
Figure 26:
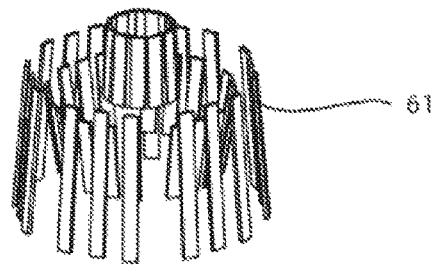
Figure 28:
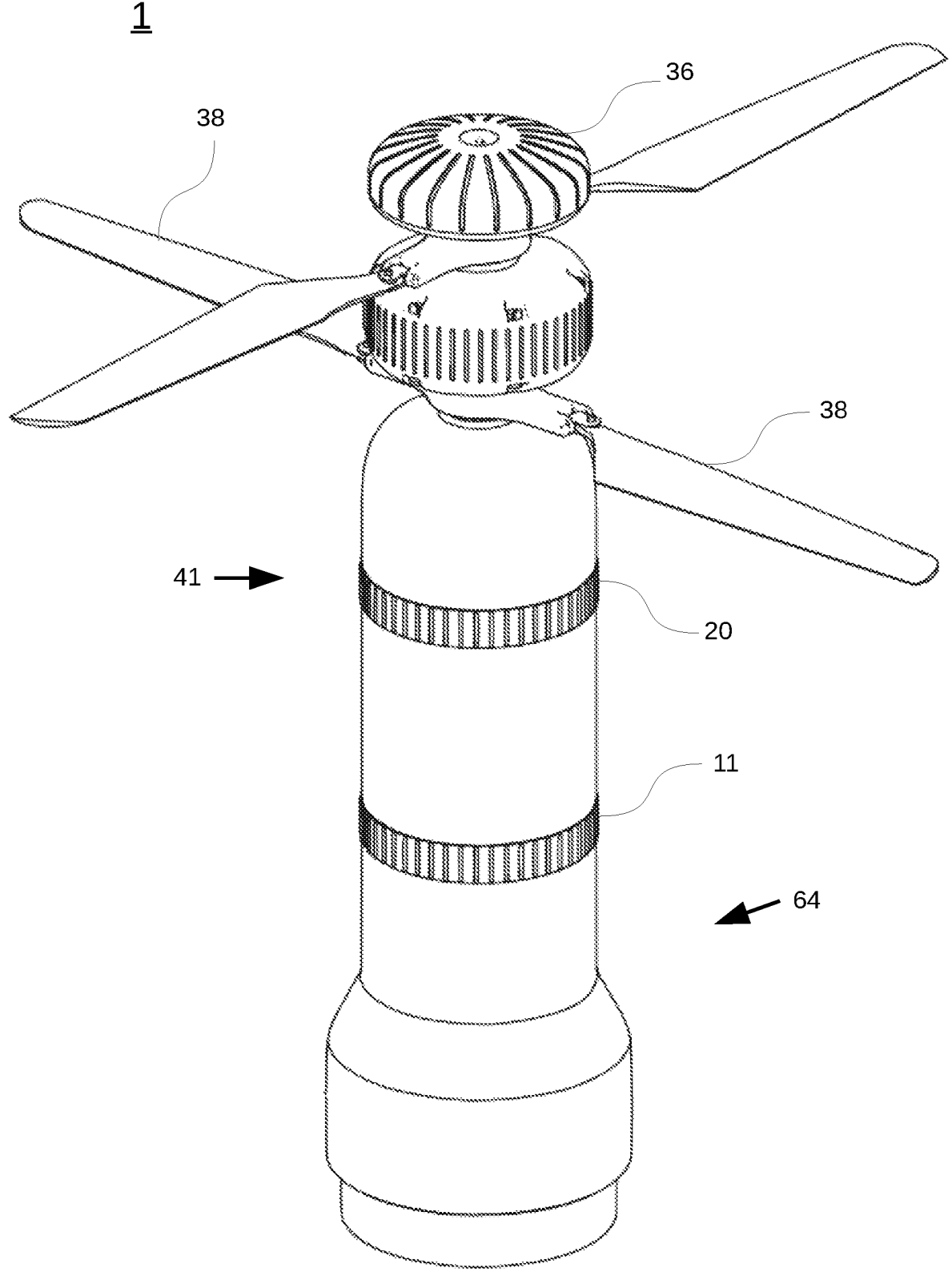
FIG. 28 illustrates a perspective view of an embodiment having an electro-magnetic pulse (EMP) head.
Figure 29:
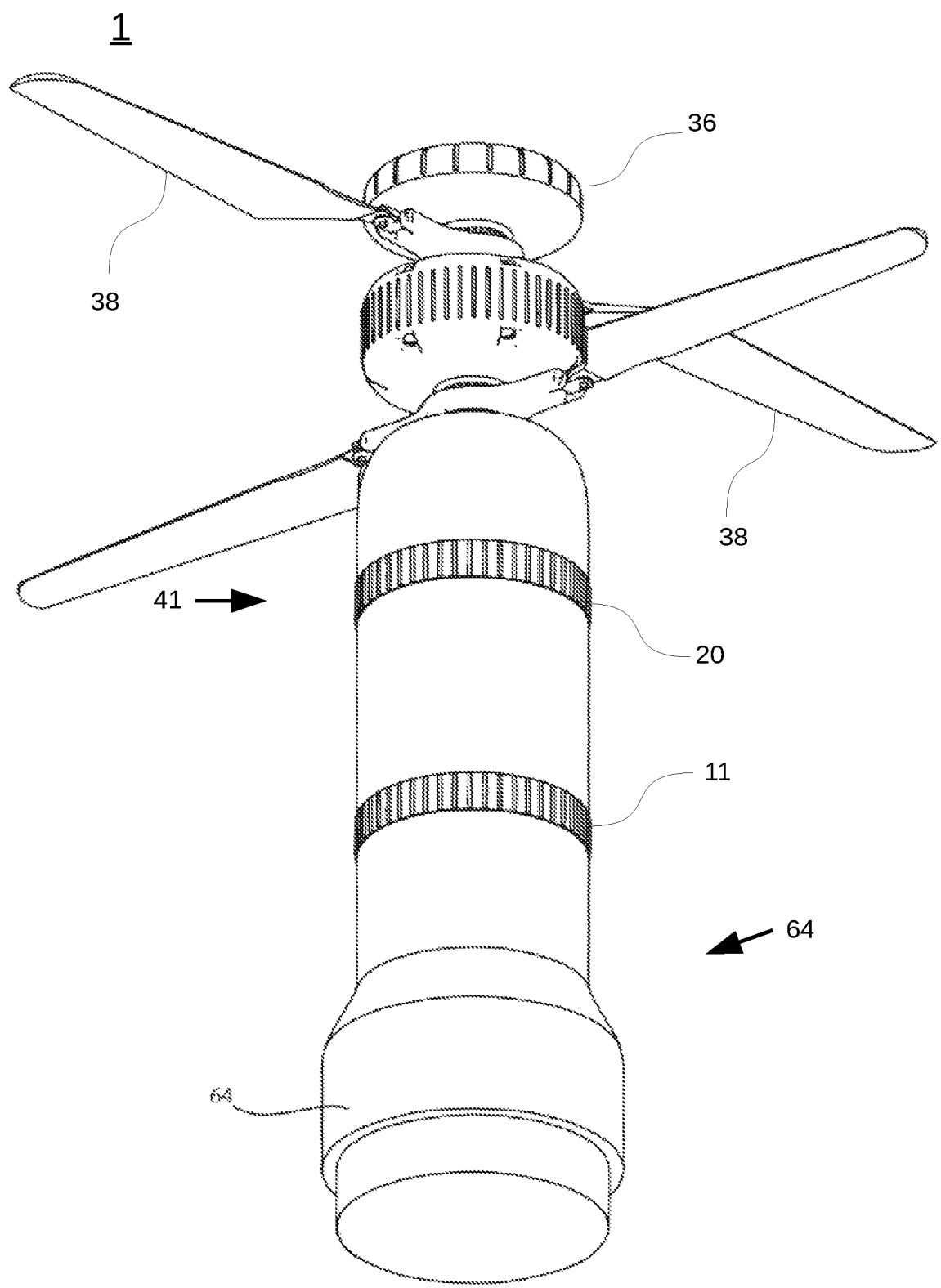
FIG. 29 illustrates another perspective view of the embodiment of FIG. 28.
Figure 30:
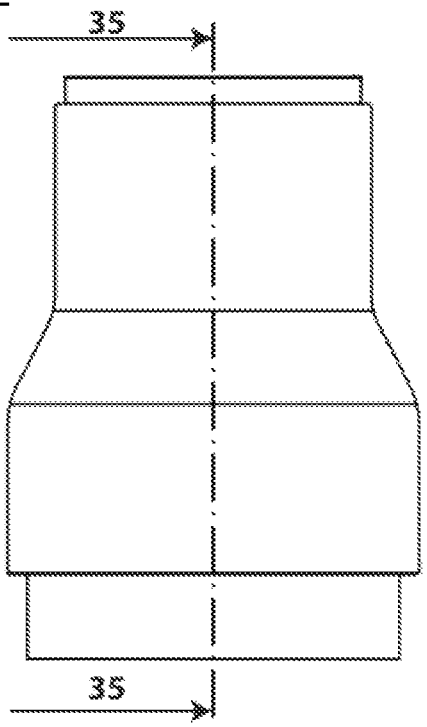
FIG. 30 illustrates a front view of an EMP head.
Figure 31:
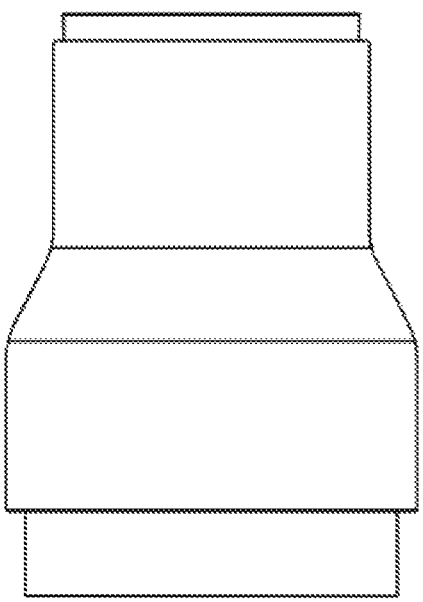
FIG. 31 illustrates a side view of the EMP head.
Figure 32:
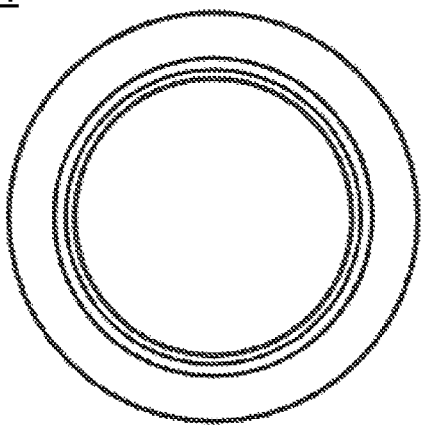
FIG. 32 illustrates a top view of the EMP head.
Figure 33:
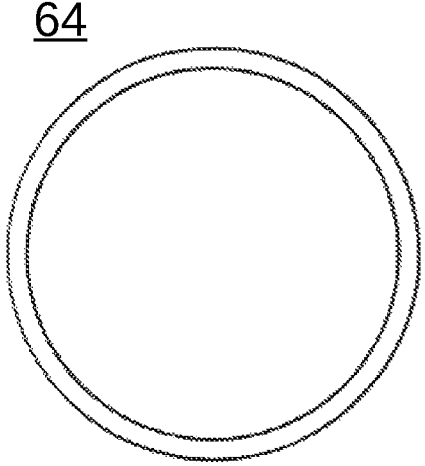
FIG. 33 illustrates a bottom view of the EMP head.
Figure 34:
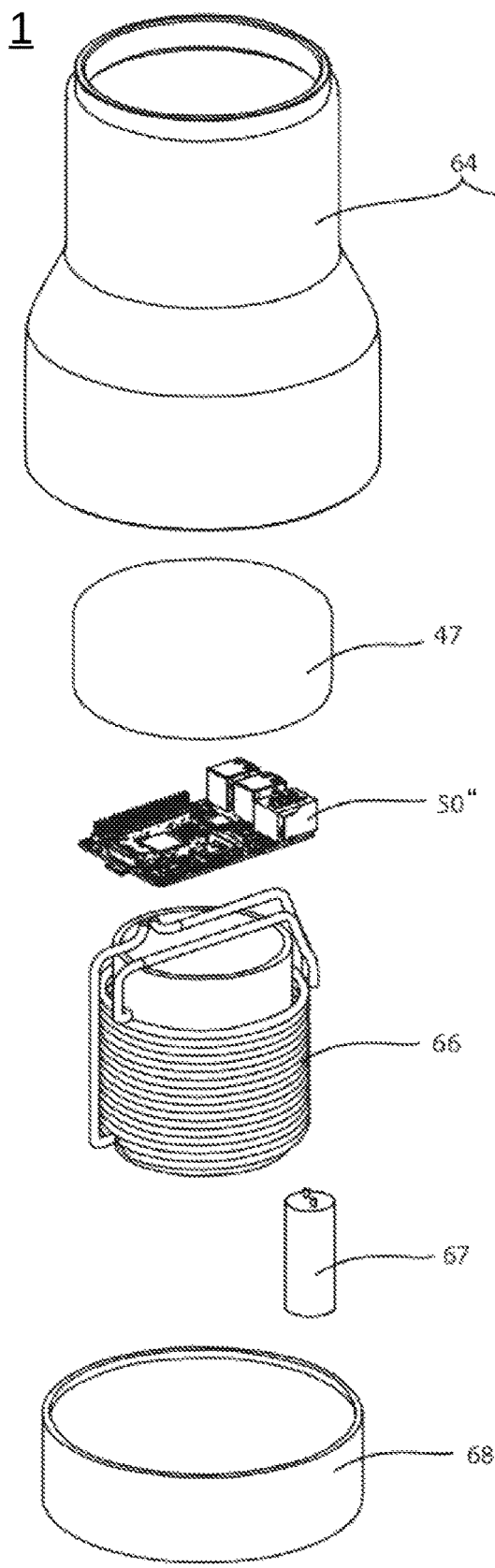
FIG. 34 illustrates an exploded view of the EMP head.
Figure 35:
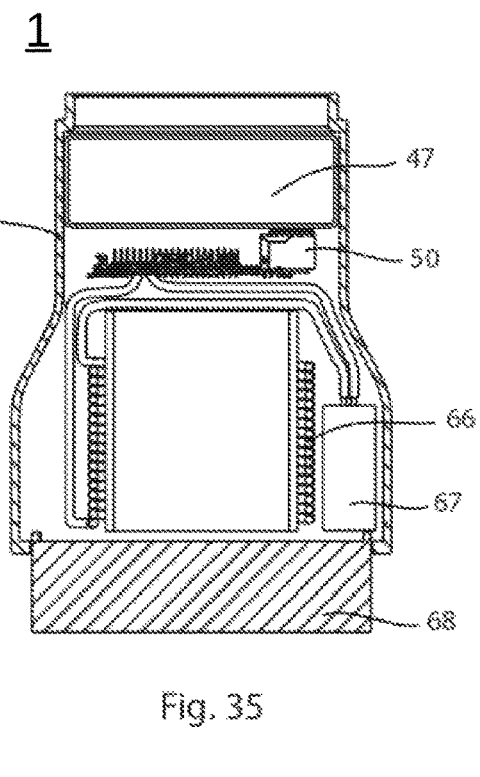
FIG. 35 illustrates a cross section view of the EMP head taken along line 35-35 of FIG. 30.

As shown in FIGS. 18 and 20, the umbrella mechanism 59 may remain closed until it is time to activate the illumination head 58. This allows for easier storage and transport, better flight characteristics and stealth. As shown in FIGS. 19 and 21, once in position, the umbrella mechanism 59 may extend causing the reflective cover 60 to open up and place the LED strips 61 in position to illuminate the desired area (generally the ground area in this example). The units can supplant use of shorter life illumination mortars which may cause fires and cannot be "turned off". In contrast, a lighting array according to the invention can be switched on and off like a light switch when required.

As shown in FIGS. 24-27, illumination head 58 may include the battery 47 as well as an additional battery 63 to allow for longer illumination of the target area. Also included is a micro-processor based control system 50', that controls the lighting system as well as other ordnance 1 functions. The device 3 is used to control functions of the system 50.

The embodiment shown in FIGS. 28-35 illustrates an Electro-Magnetic Pulse (EMP) warhead 64 useful to disable electronic systems. In one embodiment, the EMP warhead 64 includes an attachment mechanism which allows the unit to land on a power pole or other strategic electronic target and attach itself, e.g., with a magnet 64 to a ferromagnetic surface. The unit can then disperse an EMP pulse rendering the target inoperative without creating serious damage to the infrastructure. The EMP warhead 64 includes the battery 47, a micro-processor system 50", as well as copper coils 66 and a capacitor 67 used to generate the EMP pulse. In this embodiment, the magnet 68 is place on the bottom end of the ordnance 1, allowing it to attach where it lands (or attach in mid area depending on the flight characteristics and power of the magnet) prior to setting off the EMP pulse.

Still another option is a payload directed to crowd dispersal through the release of irritants (mace, pepper spray). Ground personnel can target specific areas of crowds by flying the unit over protesting crowds and releasing, for example, tear-gas directly above a particular group, thereby avoiding impacting innocent bystanders. Gases may also be dispersed uniformly over an entire crowd, avoiding the utilization of projectiles which can harm people or be thrown back at peace keeping personnel.

In some embodiments the payload may include a High-Energy Phosphorous warhead, which can attach to a tank or other vehicle or equipment, e.g., via a magnet, and then ignite to burn through metals or other materials rendering the target useless. Armored vehicles, aircraft and radar, equipment are exemplary targets.

In addition to having embodiments with adaptable payloads, the invention is also scalable to include different size drone/payload packages depending on the mission. For instance, the disclosed drone bomb system is scalable and can be made available in multiple (e.g., three) sizes. Thus, one embodiment may be a mini system of a hand-held size, approximately 8 inches in length and attachable to a soldier's MOLLE vest in a pouch in a manner similar to the M203 grenade. This unit, which may only include a deadly payload warhead, can be small enough to allow a soldier to carry several units and guide them remotely to their targets, while the soldier is never exposed to greater danger. Such a ordnance could take the place of or be improvements upon many of the armaments used today such as mortars and M203 grenade launcher type systems.

Other possible embodiments include mid-size systems which have interchangeable warheads and may be approximately 22 inches in length, attachable to a soldiers' rucksacks in tubes attached to the MOLLE system. While some embodiments may be a large size system, e.g., approximately 6 feet in length that can carry a lethal payload capable of leveling a terrorist camp. This embodiment is compatible with the military's automated flight software and can be delivered over a distance of 50 miles or more.

The value of cover for an enemy may be completely neutralized as the disclosed drone bomb system is an effective payload-delivering system that features pinpoint precision. The system may be in the form of a handheld, man-portable drone bomb that can neutralize snipers or hidden targets while, perhaps more importantly, removing the need for soldiers to expose themselves from behind cover. Utilizing a remote-control unit, soldiers can more safely launch the drone bomb systems, which have thermal imaging capability, from their backpacks. A 22-inch long drone bomb system may weigh 5 pounds and have a range of 25 kilometers. Once a coaxial UAV embodiment of the drone bomb system is above its objective and the target is positioned in the thermal reticle of the soldiers' display unit, the explosive is dropped onto the target utilizing gravity or reverse thrust. A deadly payload of explosives is delivered while avoiding the types of collateral damage that other weapons may cause. The drone bomb system may provide soldiers with an estimated 500% improvement in hit probability.

Example embodiments of the invention have been illustrated but the invention is not so limited. Accordingly, the scope of the disclosure is only limited by the claims which follow with each claim constituting a separate embodiment. Embodiments may combine different claims. Combinations of different embodiments are within the scope of the claims and will be apparent to those of ordinary skill in the art after reviewing this disclosure.

The claimed invention is:

1. A method of delivering an explosive ordnance from a first altitude to a destination on or above a ground plane and avoiding collateral damage, the method including:
   a. providing an ordnance comprising:
      a tubular shaped body having first and second opposing end portions and an explosive component positioned therein;
      a plurality of blades connected to the body at or near the first end portion for rotation about the body under powered operation to impart thrust and bring the ordnance to a first altitude above a target position;
      a motor positioned within the tubular shaped body, connected to selectively provide the powered operation to impart the thrust and thereby provide propulsive lift to the ordnance via the blade rotation;
      an imaging device mounted along the second end portion to generate frames of image data representative of a view of a ground plane while the ordnance is airborne, where the imaging device acquires infrared or visible light images;
      first receiver circuitry configured to receive radio frequency (rf) control signals and coupled to effect operation of other components of the ordnance in response to the received signals;
      rf video transmission circuitry coupled to receive the frames of image data and transmit rf signals comprising a stream of the image data;
   b. providing a user controllable remote control device, positionable remote from the ordnance, the remote control device including circuitry comprising a combination of:
      (i) rf control circuitry that, responsive to user input, transmits control signals for a person to direct operation of the ordnance when flying and hovering;
      (ii) rf receiver circuitry for receiving the stream of image data; and
      (iii) video processing circuitry that receives the image data from the rf receiver circuitry and displays image data from the stream of image data for display on a screen wherein:
   when the ordnance is airborne above a ground plane,
      (i) the blades are positioned above the motor and are connected to the motor via a shaft for rotation about a central axis, and
      (ii) the imaging device can generate frames of image data representative of a view of a portion of the ground plane directly below the ordnance, and
      after the powered operation is initiated to impart the propulsive lift to the ordnance, frames of image data, representative of a view of a portion of the ground plane vertically directly below the ordnance, can be generated based on image data acquired with the imaging unit positioned on the ordnance, and one or more first control signals can be sent from the remote control device to navigate movement of the ordnance to an airborne position above the target position; and
   with the ordnance in an airborne position above the target position, one or more second control signals can be sent from the remote control device to cause the ordnance to descend toward the target position, and detonate the explosive component.

2. The method of claim 1 where the ordnance includes a mechanism by which an operator may, via an operation performed on the remote control device, cease motor operation of the ordnance to drop the ordnance from the first altitude and toward the target position.

3. The method of claim 1 where the step causing the ordnance to descend provides powered descent effected by transitioning blades from a lift or hover mode to a descent mode by reversal of blade direction of rotation.

4. The method of claim 1 where the step of sending the one or more second control signals ceases provision of powered blade rotation, causing the ordnance to descend under gravitational force toward the target position.

5. The method of claim 1 where the step of sending the one or more second control signals causes the ordnance to hover directly above the target position before descending on the target position.

6. The method of claim 1 where the step of detonating the explosive component is effected with (i) an impact fuse when the ordnance strikes a surface, or (ii) a detonator switch operable to detonate the explosive component.

7. The method of claim 1 where the explosive component is selectively effected by an operator with either (i) an impact fuse
when the ordnance strikes a surface, or (ii) a detonator switch operable to detonate the explosive component and, if the operator of the remote control device desires to detonate the explosive component without deployment of the impact fuse, the step of detonating comprises operating the detonator switch with a third control signal transmitted from the remote control device to detonate the explosive component at or above the ground plane.

8. The method of claim 1 where the ordnance further includes a detonator switch operable to detonate the explosive component and, if the explosive component fails to detonate on impact, the step of detonating comprises operating the detonator switch with a third control signal from the remote control device to detonate the explosive component.

9. The method of claim 1 where the ordnance is deployed while being hand held by an operator.

10. The method of claim 9 where the ordnance is deployed by powering the ordnance while the operator holds the ordnance and then controls movement of the ordnance via the remote control device.

11. The method of claim 10 where
(iv) the display is viewable by the operator;
(v) the operator observes the current position of the ordnance over the ground plane by looking at the display; and
c. when the operator identifies a target beneath the ordnance via the display, the operator uses the remote control device to enable the ordnance to descend in a downward direction toward or directly upon the selected target
(vi).

12. The method of claim 1 where the ordnance descends from the first altitude in a vertical direction, relative to the ground plane, to the target position.

13. The method of claim 1 where the powered operation deploys the blades from a collapsed or retracted position to an expanded position for rotation and provision of the lift.

14. The method of claim 13 where the blades are spring loaded to effect deployment to expanded positions.

15. An aeronautical device for vertical take-off and flight above a ground plane, comprising:
a case comprising an upper case portion and a lower case portion, the lower case portion connected to a bottom portion of the upper case portion;
a plurality of deployable coaxial blades connected to the upper case such that, when deployed, the blades are rotatable about the upper case to impart thrust and bring the ordnance to a first altitude above a desired position;
a motor attached to the upper case portion and connected to selectively provide power to rotate the blades to enable vertical take-off and flight;
a payload attached to the case;
an imaging system attached to the lower case, which can be oriented to generate image data representative of a view from the ordnance of a portion of the ground plane directly below the ordnance during flight, and
a switch connected to drop the ordnance from the first altitude and on to the target; and
wherein one or more first control signals can be sent from a remote control device to navigate movement of the ordnance to an airborne position above the target position.

16. A system comprising the aeronautical device of claim 15 further including:
a microprocessor-based subsystem operatively connected to control steering and operation of the ordnance, including operation the motor and the camera, and adjustment of the blades for steering; and
the remote control device configure to steer the ordnance to a position above the target and drop the ordnance on the target, said device capable of transmitting data to and receiving data from the microprocessor-based subsystem via a rf link to effect control of the operation of the ordnance, including the function of the switch to drop the ordnance from the first altitude.

17. The aeronautical device according to claim 16, further comprising a receiver configured to receive a remote signal such that, when the ordnance is deployed, flight of the ordnance is controllable via the remote signal so as to steer the ordnance to a position and hover above the desired position.

18. The ordnance according to claim 17, wherein the blades are configured so as to retract when rotation of the blades ceases.

19. The aeronautical device according to claim 16, wherein the payload includes at least one of an (i) explosive coupled to a switch enabling the aeronautical device to function as an ordnance operable to be dropped from a first altitude toward the desired position, (ii) a nuclear detector, (iii) a chemical detector, (iv) a biological agent detector, (v) a phosphorus payload, (vi) a chemical payload, or (vii) a lighting system configured to illuminate an area around the ordnance.

* * * * *